US008083849B2

(12) United States Patent
Lewis et al.

(10) Patent No.: US 8,083,849 B2
(45) Date of Patent: *Dec. 27, 2011

(54) ACTIVATING COMPOSITIONS IN SUBTERRANEAN ZONES

(75) Inventors: Sam Lewis, Duncan, OK (US); Priscilla Reyes, Duncan, OK (US); Craig Roddy, Duncan, OK (US); Lynn Davis, Holly Springs, NC (US); Mark Roberson, Cary, NC (US); Anthony Badalamenti, Katy, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 224 days.

This patent is subject to a terminal disclaimer.

(21) Appl. No.: 12/547,275

(22) Filed: Aug. 25, 2009

(65) Prior Publication Data

US 2010/0050905 A1 Mar. 4, 2010

Related U.S. Application Data

(63) Continuation-in-part of application No. 11/695,329, filed on Apr. 2, 2007, now Pat. No. 7,712,527.

(51) Int. Cl.
| | | |
|---|---|---|
| C04B 7/00 | (2006.01) | |
| C04B 7/34 | (2006.01) | |
| C04B 28/00 | (2006.01) | |
| C04B 32/00 | (2006.01) | |
| C04B 16/08 | (2006.01) | |
| C04B 20/00 | (2006.01) | |
| C04B 38/00 | (2006.01) | |
| C04B 14/00 | (2006.01) | |
| C04B 24/00 | (2006.01) | |
| C04B 24/10 | (2006.01) | |
| E21B 43/22 | (2006.01) | |
| E21B 33/13 | (2006.01) | |

(52) U.S. Cl. ........ 106/638; 106/673; 106/677; 106/606; 166/286; 166/282; 166/293

(58) Field of Classification Search ............... 166/177.4, 166/282; 106/638
See application file for complete search history.

(56) References Cited

U.S. PATENT DOCUMENTS 3,239,005 A  3/1966  Bodine, Jr.
(Continued)

FOREIGN PATENT DOCUMENTS

GB  2391565  2/2004
(Continued)

OTHER PUBLICATIONS

"Ultrasound-Enhanced Polymer Degradation and Release of Incorporated Substances" Proc. Natl. Acad. Sci. USA 1989, vol. 86, pp. 7663-7666.

(Continued)

*Primary Examiner* — Jerry Lorengo
*Assistant Examiner* — Karam Hijji
(74) *Attorney, Agent, or Firm* — Craig W. Roddy; Fish & Richardson, P.C.

(57) ABSTRACT

The present disclosure is directed to a system and method for managing cement in a subterranean zone. In some implementations, a method of cementing in a subterranean formation includes positioning a cement slurry including a plurality of activation devices in a wellbore. The activation devices configured to release an activator that increases a setting rate of the cement slurry. A signal is transmitted to at least a portion of the cement slurry to activate the activation devices. The activation device releases the activator in response to at least the signal.

22 Claims, 11 Drawing Sheets

U.S. PATENT DOCUMENTS

| | | | |
|---|---|---|---|
| 4,512,401 A | 4/1985 | Bodine |
| 4,653,587 A | 3/1987 | Bodine |
| 4,736,794 A | 4/1988 | Bodine |
| 5,261,492 A | 11/1993 | Duell et al. |
| 5,277,253 A | 1/1994 | Giroux et al. |
| 5,368,103 A | 11/1994 | Heathman et al. |
| 5,437,329 A | 8/1995 | Brooks et al. |
| 5,566,757 A | 10/1996 | Carpenter et al. |
| 5,829,522 A | 11/1998 | Ross et al. |
| 6,457,524 B1 | 10/2002 | Roddy |
| 6,739,806 B1 | 5/2004 | Szymanski et al. |
| 6,868,908 B2 | 3/2005 | Badalamenti |
| 6,973,969 B2 | 12/2005 | Roddy et al. |
| 6,978,834 B1 | 12/2005 | Chatterji et al. |
| 6,982,000 B2 | 1/2006 | Chatterji et al. |
| 7,036,586 B2 | 5/2006 | Roddy et al. |
| 7,067,000 B1 | 6/2006 | Szymanski et al. |
| 7,077,203 B1 | 7/2006 | Roddy et al. |
| 7,086,466 B2 | 8/2006 | Roddy |
| 7,150,322 B2 | 12/2006 | Szymanski et al. |
| 7,156,174 B2 | 1/2007 | Roddy et al. |
| 7,159,659 B2 | 1/2007 | Welton et al. |
| 7,174,962 B1 | 2/2007 | Roddy et al. |
| 7,191,834 B2 | 3/2007 | Lewis et al. |
| 7,199,086 B1 | 4/2007 | Roddy et al. |
| 7,204,307 B2 | 4/2007 | Roddy et al. |
| 7,204,310 B1 | 4/2007 | Roddy et al. |
| 7,204,312 B2 | 4/2007 | Roddy et al. |
| 7,213,646 B2 | 5/2007 | Roddy et al. |
| 7,240,732 B2 | 7/2007 | Lewis et al. |
| 7,252,147 B2 | 8/2007 | Badalamenti et al. |
| 7,258,738 B2 | 8/2007 | Lewis et al. |
| 7,273,949 B2 | 9/2007 | Lewis et al. |
| 7,284,608 B2 | 10/2007 | Reddy et al. |
| 7,284,609 B2 | 10/2007 | Roddy et al. |
| 7,290,611 B2 | 11/2007 | Badalamenti et al. |
| 7,293,609 B2 | 11/2007 | Dealy et al. |
| 7,293,941 B2 | 11/2007 | Lewis et al. |
| 7,299,874 B2 | 11/2007 | Welton et al. |
| 7,303,008 B2 | 12/2007 | Badalamenti et al. |
| 7,303,014 B2 | 12/2007 | Reddy et al. |
| 7,303,019 B2 | 12/2007 | Welton et al. |
| 7,322,412 B2 | 1/2008 | Badalamenti et al. |
| 7,335,252 B2 | 2/2008 | Roddy et al. |
| 7,337,842 B2 | 3/2008 | Roddy et al. |
| 7,338,923 B2 | 3/2008 | Roddy et al. |
| 7,341,104 B2 | 3/2008 | Roddy |
| 7,350,575 B1 | 4/2008 | Lewis et al. |
| 7,353,870 B2 | 4/2008 | Roddy et al. |
| 7,360,598 B1 | 4/2008 | Lewis et al. |
| 7,381,263 B2 | 6/2008 | Roddy et al. |
| 7,387,675 B2 | 6/2008 | Roddy et al. |
| 7,388,045 B1 | 6/2008 | Lewis et al. |
| 7,389,815 B2 | 6/2008 | Badalamenti et al. |
| 7,395,860 B2 | 7/2008 | Roddy et al. |
| 7,399,355 B2 | 7/2008 | Szymanski et al. |
| 7,401,646 B2 | 7/2008 | Badalamenti et al. |
| 7,404,440 B2 | 7/2008 | Reddy et al. |
| 7,409,991 B2 | 8/2008 | Reddy et al. |
| 7,424,913 B2 | 9/2008 | Roddy |
| 7,431,086 B2 | 10/2008 | Lewis et al. |
| 7,445,669 B2 | 11/2008 | Roddy et al. |
| 7,445,670 B2 | 11/2008 | Lewis et al. |
| 7,451,817 B2 | 11/2008 | Reddy et al. |
| 7,478,675 B2 | 1/2009 | Roddy et al. |
| 7,503,399 B2 | 3/2009 | Badalamenti et al. |
| 7,523,784 B2 | 4/2009 | Lewis et al. |
| 7,576,040 B2 | 8/2009 | Lewis et al. |
| 7,576,042 B2 | 8/2009 | Lewis et al. |
| 7,607,482 B2 | 10/2009 | Roddy et al. |
| 7,607,484 B2 | 10/2009 | Roddy et al. |
| 7,617,870 B1 | 11/2009 | Roddy et al. |
| 7,621,336 B2 | 11/2009 | Badalamenti et al. |
| 7,621,337 B2 | 11/2009 | Badalamenti et al. |
| 7,631,692 B2 | 12/2009 | Roddy et al. |
| 7,636,671 B2 | 12/2009 | Caveny et al. |
| 2003/0221831 A1 | 12/2003 | Reddy et al. |
| 2004/0047534 A1 | 3/2004 | Shah et al. |
| 2004/0180793 A1 | 9/2004 | Ramos et al. |
| 2005/0006020 A1 | 1/2005 | Jose Zitha et al. |
| 2005/0139353 A1 | 6/2005 | Johnson, Jr. et al. |
| 2006/0081372 A1 | 4/2006 | Dealy et al. |
| 2006/0086499 A1 | 4/2006 | Badalamenti et al. |
| 2006/0086502 A1 | 4/2006 | Reddy et al. |
| 2006/0086503 A1 | 4/2006 | Reddy et al. |
| 2006/0162926 A1 | 7/2006 | Roddy |
| 2006/0166834 A1 | 7/2006 | Roddy |
| 2006/0180308 A1 | 8/2006 | Welton et al. |
| 2006/0180309 A1 | 8/2006 | Welton et al. |
| 2006/0180310 A1 | 8/2006 | Welton et al. |
| 2006/0183646 A1 | 8/2006 | Welton et al. |
| 2006/0189487 A1 | 8/2006 | Szymanski et al. |
| 2006/0250243 A1 | 11/2006 | Masino et al. |
| 2007/0028810 A1 | 2/2007 | Lewis et al. |
| 2007/0029089 A1 | 2/2007 | Lewis et al. |
| 2007/0032550 A1 | 2/2007 | Lewis et al. |
| 2007/0056474 A1 | 3/2007 | Roddy et al. |
| 2007/0056475 A1 | 3/2007 | Roddy et al. |
| 2007/0056476 A1 | 3/2007 | Roddy et al. |
| 2007/0056728 A1 | 3/2007 | Roddy et al. |
| 2007/0056732 A1 | 3/2007 | Roddy et al. |
| 2007/0056733 A1 | 3/2007 | Roddy et al. |
| 2007/0056734 A1 | 3/2007 | Roddy et al. |
| 2007/0089643 A1 | 4/2007 | Roddy et al. |
| 2007/0089880 A1 | 4/2007 | Roddy et al. |
| 2007/0102157 A1 | 5/2007 | Roddy et al. |
| 2007/0119346 A1 | 5/2007 | Lewis et al. |
| 2007/0123434 A1 | 5/2007 | Lewis et al. |
| 2007/0125276 A1 | 6/2007 | Reddy et al. |
| 2007/0125534 A1 | 6/2007 | Reddy et al. |
| 2007/0155629 A1 | 7/2007 | Lewis et al. |
| 2007/0155982 A1 | 7/2007 | Lewis et al. |
| 2007/0203028 A1 | 8/2007 | Lewis et al. |
| 2007/0238621 A1 | 10/2007 | Roddy et al. |
| 2008/0011481 A1 | 1/2008 | Badalamenti et al. |
| 2008/0011482 A1 | 1/2008 | Badalamenti et al. |
| 2008/0041584 A1 | 2/2008 | Reddy et al. |
| 2008/0041585 A1 | 2/2008 | Reddy et al. |
| 2008/0041590 A1 | 2/2008 | Badalamenti et al. |
| 2008/0041591 A1 | 2/2008 | Reddy et al. |
| 2008/0169100 A1 | 7/2008 | Lewis et al. |
| 2008/0169101 A1 | 7/2008 | Lewis et al. |
| 2008/0171673 A1 | 7/2008 | Lewis et al. |
| 2008/0171674 A1 | 7/2008 | Lewis et al. |
| 2008/0171806 A1 | 7/2008 | Lewis et al. |
| 2008/0227667 A1 | 9/2008 | Szymanski et al. |
| 2008/0277116 A1 | 11/2008 | Roddy et al. |
| 2008/0305343 A1* | 12/2008 | Toohey et al. ............ 428/447 |
| 2009/0088348 A1 | 4/2009 | Roddy et al. |
| 2009/0139719 A1 | 6/2009 | Luo et al. |
| 2009/0159282 A1 | 6/2009 | Webb et al. |
| 2009/0200029 A1 | 8/2009 | Roddy et al. |
| 2009/0236097 A1 | 9/2009 | Roddy et al. |
| 2009/0260544 A1 | 10/2009 | Roddy et al. |
| 2009/0264557 A1 | 10/2009 | Lewis et al. |
| 2009/0312445 A1 | 12/2009 | Roddy et al. |
| 2009/0320720 A1 | 12/2009 | Roddy et al. |
| 2010/0016183 A1 | 1/2010 | Roddy et al. |
| 2010/0050905 A1 | 3/2010 | Lewis et al. |
| 2010/0051275 A1 | 3/2010 | Lewis et al. |

FOREIGN PATENT DOCUMENTS

| | | |
|---|---|---|
| GB | 2431400 | 4/2007 |
| WO | WO2006/136635 | 12/2006 |
| WO | WO2009/008735 | 1/2009 |

OTHER PUBLICATIONS

"BioMEMS Review: MEMS Technology for Physiologically Integrated Devices" Proc. IEEE, 2004, vol. 92(1), pp. 6-21.

"A Bubble-Driven Microfluidic Transport Element for Bioengineering" Proc. Natl. Acad. Sci. USA, 2004, vol. 101, pp. 9523-9527.

"Microfluidics with Ultrasound-Driven Bubbles" J. Fluid Mech., 2006, vol. 568, pp. 109-118.

Frim, J.A. et al., "Sonochemical Destruction of Free and Metal-Binding Ethylenediaminetetraacetic Acid" Water Research, 2003, 37, 3155-3163.

European Search Report (4 pages) issued May 19, 2011, for related European application 11159484.2.
European Search Report (4 pages) issued May 19, 2011, for related European application 11159483.4.
Notification of Transmittal of the International Search Report and the Written Opinion of the International Searching Authority, or Declaration (1 page); International Search Report (4 pages); and Written Opinion of the International Searching Authority (5 pages), mailed Apr. 21, 2011, for related international application PCT/GB2010/001580.
Notification of Transmittal of the International Search Report and the Written Opinion of the International Searching Authority, or Declaration (1 page); International Search Report (4 pages); and Written Opinion of the International Searching Authority (5 pages), mailed Apr. 21, 2011, for related international application PCT/GB2010/001590.
Notification of Transmittal of the International Search Report and the Written Opinion of the International Searching Authority, or Declaration (1 page); International Search Report (4 pages); and Written Opinion of the International Searching Authority (7 pages), mailed Apr. 28, 2011, for related international application PCT/GB2010/001560.
Dmitrij Krylov et al., "Method of Cementing Oil-Gas Bore Hole" Thomson Scientific, London, AN 1978-61785A, XP002633100, Sep. 30, 1977 (1 page).

* cited by examiner

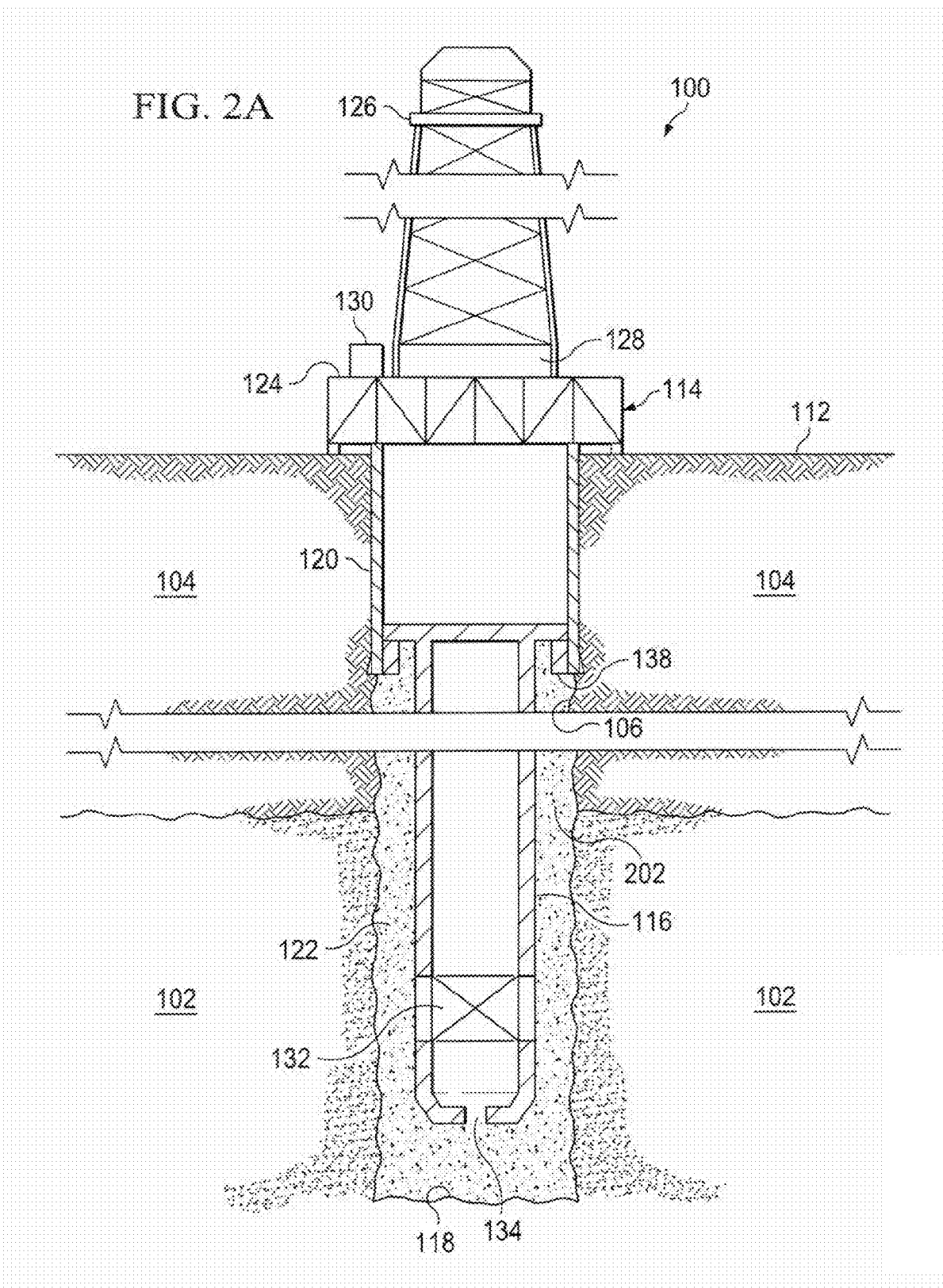

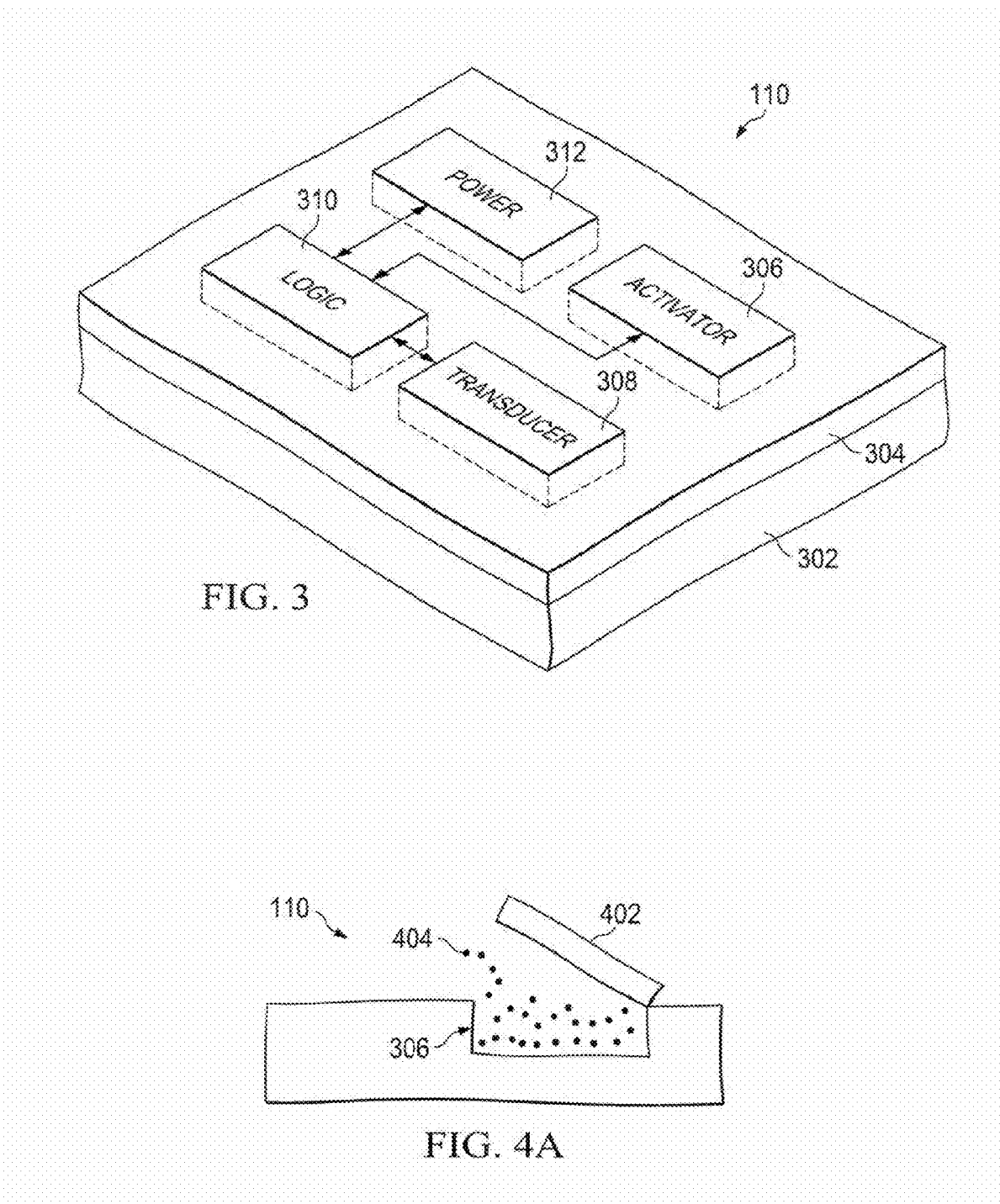

ACTIVATING COMPOSITIONS IN SUBTERRANEAN ZONES

CROSS-REFERENCE TO RELATED APPLICATIONS

This application is continuation-in-part application of U.S. patent application Ser. No. 11/695,329, filed on Apr. 2, 2007 now U.S. Pat. No. 7,712,527, entitled "Use of Micro-Electro-Mechanical Systems (MEMS) in Well Treatments," the entire contents of which are hereby incorporated by reference.

TECHNICAL FIELD

This invention relates to cementing operations and, more particularly, to activating cement compositions in subterranean zones.

BACKGROUND

Natural resources such as gas, oil, and water residing in a subterranean formation or zone are usually recovered by drilling a wellbore into the subterranean formation while circulating a drilling fluid in the wellbore. After terminating the circulation of the drilling fluid, a string of pipe (e.g., casing) is run in the wellbore. The drilling fluid is then usually circulated downward through the interior of the pipe and upward through the annulus, which is located between the exterior of the pipe and the walls of the wellbore. Some wellbores, for example, those of some oil and gas wells, are lined with a casing. The casing stabilizes the sides of the wellbore. Next, primary cementing is typically performed whereby a cement slurry is placed in the annulus and permitted to set into a hard mass (i.e., sheath) to thereby attach the string of pipe to the walls of the wellbore and seal the annulus. In a cementing operation, cement is introduced down the wellbore and into an annular space between the casing and the surrounding earth. The cement secures the casing in the wellbore, and prevents fluids from flowing vertically in the annulus between the casing and the surrounding earth. Different cement formulations are designed for a variety of wellbore conditions, which may be above ambient temperature and pressure. In designing a cement formulation, a number of potential mixtures may be evaluated to determine their mechanical properties under various conditions. Subsequent secondary cementing operations may also be performed. One example of a secondary cementing operation is squeeze cementing whereby a cement slurry is employed to plug and seal off undesirable flow passages in the cement sheath and/or the casing. Non-cementitious sealants are also utilized in preparing a wellbore. For example, polymer, resin, or latex-based sealants may be desirable for placement behind casing.

To enhance the life of the well and minimize costs, sealant slurries are chosen based on calculated stresses and characteristics of the formation to be serviced. Suitable sealants are selected based on the conditions that are expected to be encountered during the sealant service life. Once a sealant is chosen, it is desirable to monitor and/or evaluate the health of the sealant so that timely maintenance can be performed and the service life maximized. The integrity of sealant can be adversely affected by conditions in the well. For example, cracks in cement may allow water influx while acid conditions may degrade cement. The initial strength and the service life of cement can be significantly affected by its moisture content from the time that it is placed. Moisture and temperature are the primary drivers for the hydration of many cements and are critical factors in the most prevalent deteriorative processes, including damage due to freezing and thawing, alkali-aggregate reaction, sulfate attack and delayed Ettringite (hexacalcium aluminate trisulfate) formation. Thus, it is desirable to measure one or more sealant parameters (e.g., moisture content, temperature, pH and ion concentration) in order to monitor sealant integrity.

Active, embeddable sensors can involve drawbacks that make them undesirable for use in a wellbore environment. For example, low-powered (e.g., nanowatt) electronic moisture sensors are available, but have inherent limitations when embedded within cement. The highly alkali environment can damage their electronics, and they are sensitive to electromagnetic noise. Additionally, power must be provided from an internal battery to activate the sensor and transmit data, which increases sensor size and decreases useful life of the sensor.

SUMMARY

The present disclosure is directed to a system and method for managing cement in a subterranean zone. In some implementations, a method of cementing in a subterranean formation includes positioning a cement slurry including a plurality of activation devices in a wellbore. The activation devices configured to release an activator that increases a setting rate of the cement slurry. A signal is transmitted to at least a portion of the cement slurry to activate the activation devices. The activation device releases the activator in response to at least the signal.

In addition, disclosed herein is a method comprising placing a sealant composition comprising one or more MEMS sensors in a wellbore and allowing the sealant composition to set.

Also disclosed herein is a method of servicing a wellbore comprising placing a MEMS interrogator tool in the wellbore, beginning placement of a sealant composition comprising one or more MEMS sensors into the wellbore, and terminating placement of the sealant composition into the wellbore upon the interrogator tool coming into close proximity with the one or more MEMS sensors.

Further disclosed herein is a method comprising placing a plurality of MEMS sensors in a wellbore servicing fluid.

Further disclosed herein is a wellbore composition comprising one or more MEMS sensors, wherein the wellbore composition is a drilling fluid, a spacer fluid, a sealant, or combinations thereof.

The foregoing has outlined rather broadly the features and technical advantages of the present disclosure in order that the detailed description that follows may be better understood. Additional features and advantages of the apparatus and method will be described hereinafter that form the subject of the claims of this disclosure. It should be appreciated by those skilled in the art that the conception and the specific implementations disclosed may be readily utilized as a basis for modifying or designing other structures for carrying out the same purposes of the present disclosure. It should also be realized by those skilled in the art that such equivalent constructions do not depart from the spirit and scope of the apparatus and method as set forth in the appended claims.

The details of one or more implementations of the invention are set forth in the accompanying drawings and the description below. Other features, objects, and advantages of the invention will be apparent from the description and drawings, and from the claims.

DESCRIPTION OF DRAWINGS

FIGS. 2A and 2B are example cementing process in the well system of FIG. 1;

FIG. 3 illustrates an example activation device for activating cement slurry in a wellbore;

FIGS. 4A-C illustrate example processes for releasing activators in cement slurries;

Like reference symbols in the various drawings indicate like elements.

DETAILED DESCRIPTION

Figure 1:
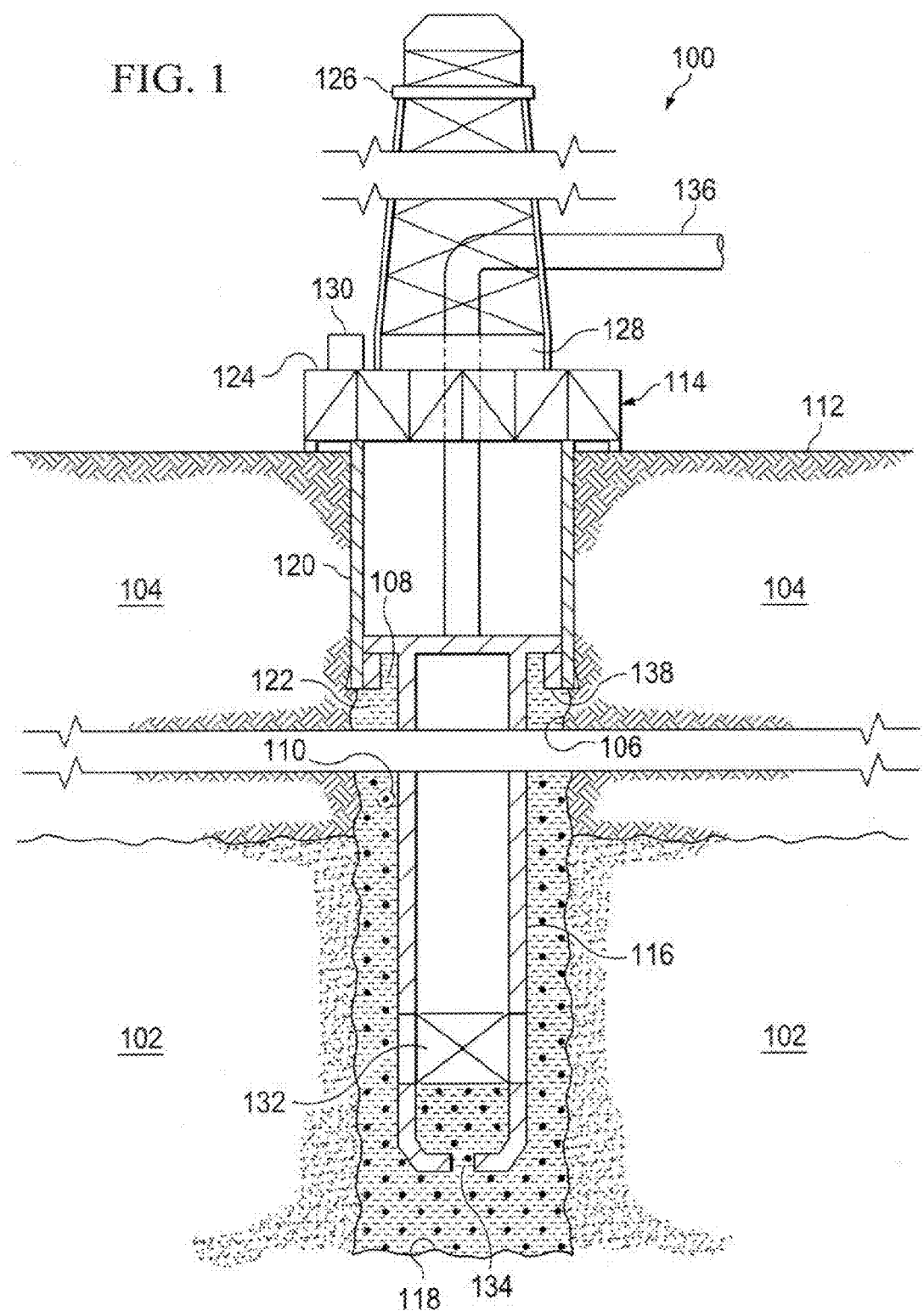
FIG. 1 is an example well system for producing fluids from a production zone.

FIG. 1 is a cross-sectional view of an example well system 100 for managing cement in a subterranean zone. For example, the system 100 may include a cement slurry with devices that executes one or more operations associated with managing the setting of the cement slurry. Operations may include determining one or more parameters of the cement and/or cement slurry (e.g., moisture content, temperature, pH, ion concentration), releasing an activator that initiates or accelerates the setting process, and/or others. In regards to implementations including sensors, the system 100 may periodically interrogate sensors in the cement to detect operating conditions over a period of time. For example, the system 100 may detect properties of cement to evaluate a status of, for example, an operating wellbore. In regards to activating the cement slurry, the system 100 may having an on-command cement delivery system that selectively controls setting of a cement slurry. In these examples, the system 100 may include a cement slurry with devices that release an activator into the cement slurry in response to at least an activation signal. An activator typically includes any chemicals that activate and/or accelerate the setting process for a cement slurry in the system 100. An activator may also retard or otherwise effect the setting or properties of the cement slurry. For example, the system 100 may include one or more of the following activators: sodium hydroxide, sodium carbonate, calcium chloride, calcium nitrite, calcium nitrate, and/or others. In addition, the system 100 may include devices with sensors and activators such that the devices release the activators in response to at least detecting predefined criteria in the cement slurry such as the pH reaching a specified threshold. In some implementations, the activation devices may include elements that substantially enclose one or more activators and that release the activator in response to at least an event. For example, the activation devices may receive a signal (e.g., infrared signal), and in response to the signal, the enclosing element may release the one or more activators. As for activating the enclosing element, the system 100 may mechanically move the enclosing element, chemically remove at least a portion of the enclosing element, resistively heat the enclosing element to form an opening, and/or other processes for releasing the one or more activators. For example, the system 100 may include Micro-Electro-Mechanical System (MEMS) devices in the cement slurry that mechanically releases the activators. In general, the system 100 includes a cement slurry in an annulus formed between a casing and a wellbore, and when the cement is set, the cement secures the casing in place. By monitoring and/or selectively controlling the setting of a cement slurry, the system 100 may allow cement properties to be tailored once the cement slurry has been pumped down the borehole. In addition, the system 100 may monitor the cement during normal operation conditions.

In some implementations, the well system 100 includes a production zone 102, a non-production zone 104, a wellbore 106, a cement slurry 108, and devices 110. The production zone 102 may be a subterranean formation including resources (e.g., oil, gas, water). The non-production zone 104 may be one or more formations that are isolated from the wellbore 106 using the cement slurry 108. For example, the zone 104 may include contaminants that, if mixed with the resources, may result in requiring additional processing of the resources and/or make production economically unviable. The cement slurry 108 may be pumped or selectively positioned in the wellbore 106. In some implementations, the properties of the cement slurry 108 may be monitored using the devices 110. Alternatively or in combination, the setting of the cement slurry 108 may be activated or accelerated using the devices 110. For example, the devices 110 may release an activator in response to a signal initiated by, for example, a user of the system 100 and/or the devices 110 detecting specified operating conditions. By monitoring and/or controlling the setting, a user may configure the system 100 without substantial interference from the setting of the cement slurry 108.

Turning to a more detailed description of the elements of system 100, the wellbore 106 extends from a surface 112 to the production zone 102. The wellbore 106 may include a rig 114 that is disposed proximate to the surface 112. The rig 114 may be coupled to a tubing string 116 that extends a substantial portion of the length of the wellbore 106 from about the surface 112 towards the production zones 102 (e.g., hydrocarbon-containing reservoir). In some implementations, the tubing string 116 can extend past the production zone 102. The tubing string 116 may extend to proximate a terminus 118 of the wellbore 106. In some implementations, the well 106 may be completed with the tubing string 116 extending to a predetermined depth proximate to the production zone 102. In short, the wellbore 106 initially extends in a substantially vertical direction toward the production zone 102. In some implementations, the wellbore 106 may include other portions that are horizontal, slanted or otherwise deviated from vertical.

The rig 114 may be centered over a subterranean oil or gas formation 102 located below the earth's surface 112. The rig 114 includes a work deck 124 that supports a derrick 126. The derrick 126 supports a hoisting apparatus 128 for raising and lowering pipe strings such as tubing string 116. Pump 130 is capable of pumping a variety of wellbore compositions (e.g., drilling fluid, cement) into the well and includes a pressure measurement device that provides a pressure reading at the pump discharge. The wellbore 106 has been drilled through the various earth strata, including formation 102. Upon completion of wellbore drilling, the tubing string 116 is often placed in the wellbore 106 to facilitate the production of oil and gas from the formation 102. The tubing string 116 is a string of pipes that extends down wellbore 106, through which oil and gas may be extracted. A cement or casing shoe 132 is typically attached to the end of the casing string when the casing string is run into the wellbore. The casing shoe 132 guides the tubing string 116 toward the center of the hole and may minimize or otherwise decrease problems associated with hitting rock ledges or washouts in the wellbore 106 as the casing string is lowered into the well. The casing shoe 132 may be a guide shoe or a float shoe, and typically comprises a tapered, often bullet-nosed piece of equipment found on the bottom of the casing string 116. The casing shoe 132 may be a float shoe fitted with an open bottom and a valve that serves to prevent reverse flow, or U-tubing, of cement slurry 108 from annulus 122 into tubing string 116 as tubing string 116 is run into wellbore 106. The region between tubing string 116 and the wall of wellbore 106 is known as the casing annulus 122. To fill up casing annulus 122 and secure tubing string 116 in place, tubing string 116 is usually "cemented" in wellbore 106, which is referred to as "primary cementing." In some implementations, the cement slurry 108 may be injected into the wellbore 106 through one or more perforations 134. The cement slurry 108 may flow through a hose 136 into the tubing string 116. In some instances, the tubing string 116 may rest or otherwise abut a lip 138 of the surface casing 120.

Figure 2B:
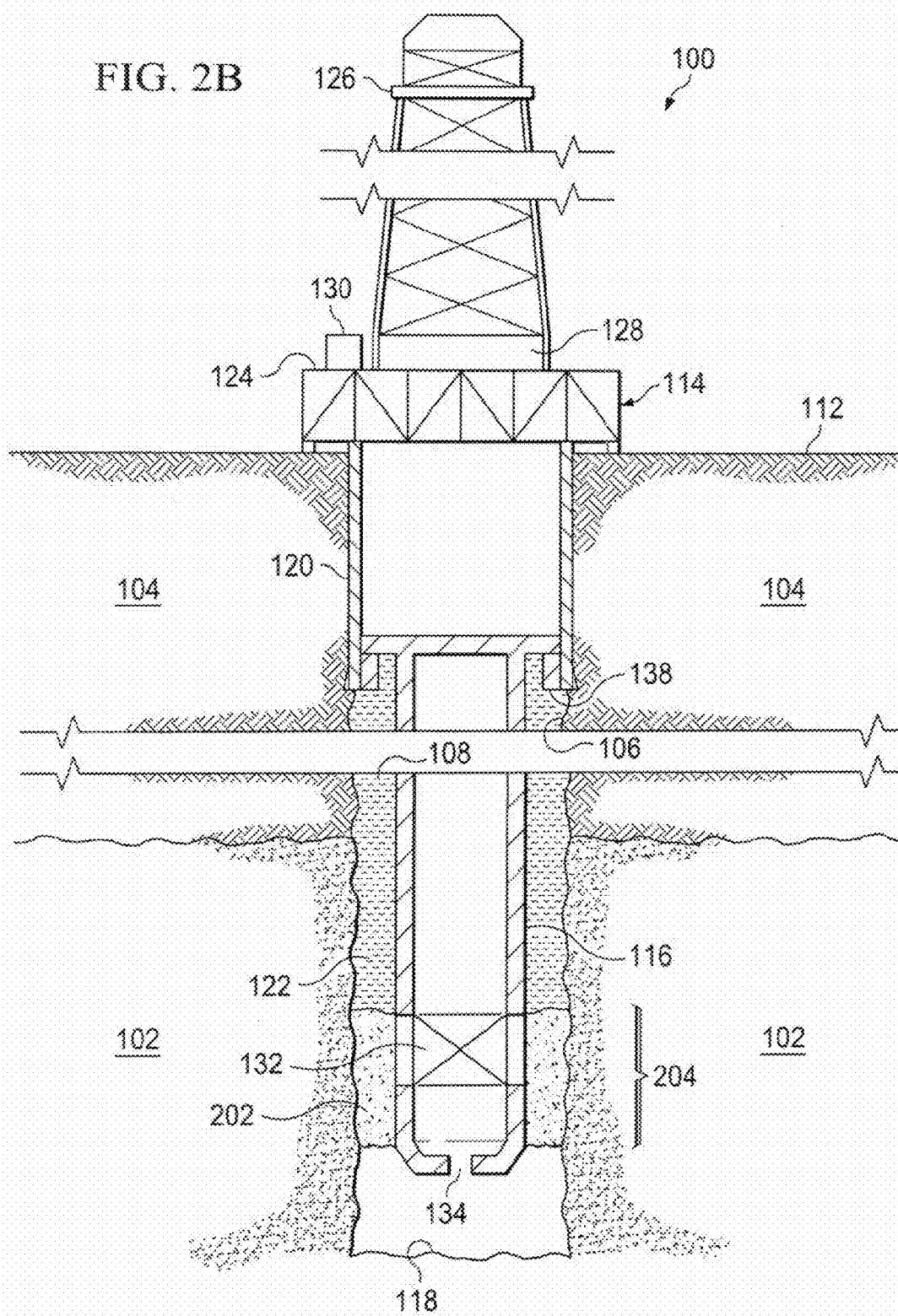

In some implementations, the system 100 may activate the setting of the cement slurry 108 using the activator devices 110 during, for example, conventional primary cementing operation. In conventional primary cementing implementations, the devices 110 may mixed into the cement slurry 108 prior to entering the tubing string 116, and the cement slurry 108 may then be pumped down the inside of the tubing string 116. For example, the devices 110 may be mixed in the cement slurry 108 at a density in the range of 4-24 pound per gallon (ppg). As the slurry 108 reaches the bottom of tubing string 116, it flows out of tubing string 116 and into casing annulus 122 between tubing string 116 and the wall of wellbore 106. As cement slurry flows up annulus 122, it displaces any fluid in the wellbore. To ensure no cement remains inside tubing string 116, devices called "wipers" may be pumped by a wellbore servicing fluid (e.g., drilling mud) through tubing string 116 behind the cement slurry 108. The wiper contacts the inside surface of tubing string 116 and pushes any remaining slurry 108 out of tubing string 116. When cement slurry reaches the earth's surface 112, and annulus 122 is filled with slurry 108, pumping is terminated. In connection with pumping the cement slurry 108 into the annulus, a signal may be transmitted to the devices 110 before, during, and/or after the pumping is complete. The signal may request detected operating conditions, initiate release of activators, and/or other operations. For instance, the devices 110 may release activators that initiate and/or accelerating the setting of the cement slurry 108 in the annulus 122 in response to at least the signal. Some or all of the tubing string 116 may be affixed to the adjacent ground material with a cement jacket as illustrated in FIGS. 2A and 2B. In some implementations, the tubing string 116 comprises a metal. After setting, the tubing string 116 may be configured to carry a fluid, such as air, water, natural gas, or to carry an electrical line, tubular string, or other elements.

After positioning the tubing string 116, a cement slurry 108 including devices 110 may be pumped into annulus 122 by a pump truck (not illustrated). Example cement slurries 110 are discussed in more detail below. In connecting with depositing or otherwise positioning the cement slurry 108 in the annulus 122, the devices 110 may release activators to activate or otherwise increase the setting rate of the cement slurry 108 in response to at least a signal. In other words, the devices 110 may activate the cement slurry 108 to set cement in the annulus 122. Alternatively or in combination, the devices 110 may detect one or more attributes of the cement slurry 108 such as moisture content, temperature, pH, ion concentration, and/or other parameters. In some implementations, substantially all of the cement sets in the annulus 122, and only a limited portion, if any, of the cement enters the interior of the tubing string 116. In some implementations, all the cement sets in the annulus 122, and no portion of the cement slurry 108 enters the interior of the tubing string 116.

In regards to the devices 110 including activators, the activation devices 110 may release an activator that initiates or accelerates the setting of the cement slurry 108. For example, the cement slurry 108 may remain in a substantially slurry state for a specified period of time, and the activation devices 110 may activate the cement slurry in response to at least a signal. The activation devices 110 may receive a signal and, in response to the signal, release activators. In some instances, the activation devices 110 enclose the activations with, for example, a membrane. In some implementations, the membrane may be metal, a polymer, and/or other element. Suitable polymers for creating such a membrane include polystyrene, ethylene/vinyl acetate copolymer, polymethylmethacrylate polyurethanes, polylactic acid, polyglycolic acid, polyvinylalcohol, polyvinylacetate, hydrolyzed ethylene/vinyl acetate, silicones, and combinations or copolymers of each. In response to the signal, the activation device 110 may form an opening in the membrane. The activation device 110 may form an opening by mechanically moving a portion of the membrane and/or by releasing a chemical that removes a portion of the membrane. In some implementations, the activation signal may directly activate the membrane. For example, the activation signal may be an ultrasonic signal that vibrates the membrane to form an opening. The activation device 110 may include a polymer membrane that ultrasonically degrades to release the enclosed activators. In some examples, an ultrasonic signal may structural change the membrane to release the activators such as, for example, opening the membrane as a flap. In some implementations, the signal includes at least one of an electromagnetic signal, a pressure signal, a magnetic signal, an electric signal, an acoustic signal, an ultrasonic signal, or a radiation signal, and wherein the radiation signal comprises at least one of neutrons, alpha particles, or beta particles. In some implementations, the cement composition may sets in a range from one hour to one day after reacting with the activator. The activation device may includes at least one dimension in a range from about 1 μm to about 10,000 μm.

The release activator may include sodium hydroxide, sodium carbonate, amine compounds, salts comprising calcium, sodium, magnesium, aluminum, and/or a mixture thereof. The activation device 110 may release a calcium salt such as calcium chloride. In some implementations, the activation device 110 may release a sodium salt such as sodium chloride, sodium aluminate, and/or sodium silicate. The activation device 110 may release a magnesium salt such as magnesium chloride. In some examples, the activation device 110 may release amine compounds such as triethanol amine, tripropanol amine, tri-isopropanol amine, and/or diethanol amine. In some implementations, the activation device 110 may release the activator in a sufficient amount to set the cement slurry 108 within about 1 minute to about 2 hours. Alternatively, the activator may be present in a sufficient amount to set the slurry within about an hour to about a day. In implementations including sodium chloride as the released activator, the concentration may be in the range of from about 3% to about 15% by weight of the cement in the cement slurry 108. In implementations including calcium chloride as the released activator, the concentration may be in the range of from about 0.5% to about 5% by weight of the cement in the cement slurry 108.

In some implementations, the activation device 110 may "flash-set" the cement slurry 108. As referred to herein, the term "flash-set" will be understood to mean the initiation of setting of the cement slurry 108 within about 1 minute to about 5 minutes after contacting the released activator. In some implementations, the previously identified activators may flash set the cement slurry 108. Flash-set activators may include sodium hydroxide, sodium carbonate, potassium carbonate, bicarbonate salts of sodium or potassium, sodium silicate salts, sodium aluminate salts, ferrous and ferric salts (e.g., ferric chloride and ferric sulfate), polyacrylic acid salts, and/or others. In some implementations, the following activators can flash-set the cement slurry 108 based on these activators exceeding a specified concentration: calcium nitrate, calcium acetate, calcium chloride, and/or calcium nitrite. In some implementations, the activation device 110 may release a solid activator.

In some implementations, the devices 110 comprise MEMS devices containing an array of microreservoirs lined with an ultrasound sensitive polymer (e.g., polyanhydrides, polyglycolides, polylactides, ethylene vinyl acetate copolymers, silicones) membranes. The microreservoirs may be loaded with one or multiple cement additives (e.g., accelerator, retarder). Upon exposure to acoustic waves (e.g., ultrasonic waves), the polymer membrane may begin to degrade/breakdown and cause the release of the desired additives. Release rate of the additives may be controlled by the intensity of the ultrasound and its duration. Not only can a MEMS device be fabricated to have microreservoirs but may include micropumps as well. The desired additive may be dispersed the pumps. Upon exposure, MEMS device 110 may have an acoustic/ultrasonic sensor/transducer/detector that once to ultrasound, the additive may be pumped via cavitation. Moreover, the MEMS trigger may cause a cascade of events (e.g., temperature increase and/or pressure) resulting in the release of the additives.

In regards to the devices 110 including one or more sensors, the sensors may be positioned within the wellbore 106. For example, the sensors 110 may extend along all or a portion of the length of the wellbore 106 adjacent the tubing string 116. The sealant slurry 108 may be placed downhole as part of a primary cementing, secondary cementing, or other sealant operation as described in more detail herein. In some implementations, a data interrogator tool can be positioned in an operable location to gather data from the sensors 110, for example lowered within the wellbore 106 proximate the sensors 110. The data interrogator tool may interrogate the data sensors 110 (e.g., by sending out an RF signal) while the data interrogator tool traverses all or a portion of the wellbore 106 containing the sensors 110. The data sensors 110 may be activated to record and/or transmit data the signal from the data interrogator tool. The data interrogator tool may communicate the data to one or more computer components (e.g., memory and/or microprocessor) that may be located within the tool, at the surface 112, or both. The data may be used locally or remotely from the tool to calculate the location of each data sensor and correlate the measured parameter(s) to such locations to evaluate sealant performance.

In some implementations, the sensors 110 include MEMS sensors that, for example, detect conditions during drilling (e.g., drilling fluid comprising MEMS sensors) or during cementing (e.g., cement slurry 108 comprising MEMS sensors) as described in more detail below. Additionally or alternatively, data gathering may be carried out at one or more times subsequent to the initial placement in the composition 108 comprising MEMS sensors 110. For example, data gathering may be carried out at the time of initial placement in the well of the composition 108 comprising MEMS sensors 110 or shortly thereafter to provide a baseline data set. As the well is operated for recovery of natural resources over a period of time, data gathering may be performed additional times, for example at regular maintenance intervals such as every 1 year, 5 years, or 10 years. The data recovered during subsequent monitoring intervals can be compared to the baseline data as well as any other data obtained from previous monitoring intervals, and such comparisons may indicate the overall condition of the wellbore 106. For example, changes in one or more sensed parameters may indicate one or more problems in the wellbore. Alternatively, consistency or uniformity in sensed parameters may indicate no substantive problems in the wellbore 106. In some implementations, data (e.g., sealant parameters) from a plurality of monitoring intervals is plotted over a period of time, and a resultant graph may be provided showing an operating or trend line for the sensed parameters. Atypical changes in the graph as indicated for example by a sharp change in slope or a step change on the graph may provide an indication of one or more present problems or the potential for a future problem. Accordingly, remedial and/or preventive treatments or services may be applied to the wellbore 106 to address present or potential problems.

In some implementations, the MEMS sensors 110 can be contained within a sealant composition 108 placed substantially within the annular space 122 between a tubing string and the wellbore wall. That is, substantially all of the MEMS sensors 110 may be located within or in close proximity to the annular space 122. In some implementations, the wellbore servicing fluid comprising the MEMS sensors 110 (and thus likewise the MEMS sensors 110) may not substantially penetrate, migrate, or travel into the formation from the wellbore 106. In an alternative embodiment, substantially all of the MEMS sensors 110 are located within, adjacent to, or in close proximity to the wellbore 106, for example less than or equal to about 1 foot, 3 feet, 5 feet, or 10 feet from the wellbore 106. Such adjacent or close proximity positioning of the MEMS sensors 110 with respect to the wellbore 106 may be in contrast to placing MEMS sensors 110 in a fluid that is pumped into the formation 102 in large volumes and substantially penetrates, migrates, or travels into or through the formation 102, for example as occurs with a fracturing fluid or a flooding fluid. Thus, in embodiments, the MEMS sensors 110 may be placed proximate or adjacent to the wellbore 106 (in contrast to the formation at large), and provide information relevant to the wellbore itself and compositions (e.g., sealants 108) used therein (again in contrast to the formation or a producing zone at large).

In some implementations, the data sensors 110 added to the sealant slurry 108 can be passive sensors that do not require continuous power from a battery or an external source in order to transmit real-time data. In some implementations, the data sensors 110 are micro-electromechanical systems (MEMS) comprising one or more (and typically a plurality of) MEMS devices, referred to herein as MEMS sensors 110. MEMS devices 110 are well known, e.g., a semiconductor device with mechanical features on the micrometer scale. MEMS embody the integration of mechanical elements, sensors, actuators, and electronics on a common substrate. In implementations, the substrate comprises silicon. MEMS elements include mechanical elements which are movable by an input energy (electrical energy or other type of energy). Using MEMS, a sensor 110 may be designed to emit a detectable signal based on a number of physical phenomena, including thermal, biological, optical, chemical, and magnetic effects or stimulation. MEMS devices 110 are minute in size, have low power requirements, are relatively inexpensive and are rugged, and thus are well suited for use in wellbore servicing operations.

In some implementations, the data sensors 110 comprise an active material connected to (e.g., mounted within or mounted on the surface of) an enclosure, the active material being liable to respond to a wellbore parameter, and the active material being operably connected to (e.g., in physical contact with, surrounding, or coating) a capacitive MEMS element. In various implementations, the MEMS sensors 110 sense one or more parameters within the wellbore 106. In some implementations, the parameter may include temperature, pH, moisture content, ion concentration (e.g., chloride, sodium, and/or potassium ions), and/or others. The MEMS sensors 110 may also sense well cement characteristic data such as stress, strain, or combinations thereof. In some implementations, the MEMS sensors 110 of the present disclosure may comprise active materials that respond to two or more measurands. In such a way, two or more parameters may be monitored.

Suitable active materials, such as dielectric materials, that respond in a predictable and stable manner to changes in parameters over a long period may be identified according to methods well known in the art, for example see, e.g., Ong, Zeng and Grimes. "A Wireless, Passive Carbon Nanotube-based Gas Sensor," IEEE Sensors Journal, 2, 2, (2002) 82-88; Ong, Grimes, Robbins and Singl, "Design and application of a wireless, passive, resonant-circuit environmental monitoring sensor," Sensors and Actuators A, 93 (2001) 33-43, each of which is incorporated by reference herein in its entirety. MEMS sensors 110 suitable for the methods of the present disclosure that respond to various wellbore parameters are disclosed in U.S. Pat. No. 7,038,470 B1 that is incorporated herein by reference in its entirety.

In some implementations, the MEMS sensors 110 can be coupled with radio frequency identification devices (RFIDs) and can detect and transmit parameters and/or well cement characteristic data for monitoring the cement during its service life. RFIDs combine a microchip with an antenna (the RFID chip and the antenna are collectively referred to as the "transponder" or the "tag"). The antenna provides the RFID chip with power when exposed to a narrow band, high frequency electromagnetic field from a transceiver. A dipole antenna or a coil, depending on the operating frequency, connected to the RFID chip, powers the transponder when current is induced in the antenna by an RF signal from the transceiver's antenna. Such a device may return a unique identification "ID" number by modulating and re-radiating the radio frequency (RF) wave. Passive RF tags are gaining widespread use due to their low cost, long life, simplicity, efficiency, ability to identify parts at a distance without contact (tether-free information transmission ability). These robust and tiny tags are attractive from an environmental standpoint as they require no battery. The MEMS sensor and RFID tag are preferably integrated into a single component 110 (e.g., chip or substrate), or may alternatively be separate components 110 operably coupled to each other. In some implementations, an integrated, passive MEMS/RFID sensor 110 can contain a data sensing component, an optional memory, and an RFID antenna, whereby excitation energy is received and powers up the sensor, thereby sensing a present condition and/or accessing one or more stored sensed conditions from memory and transmitting same via the RFID antenna.

Within the United States, commonly used operating bands for RFID systems center on one of the three government assigned frequencies: 125 kHz, 13.56 MHz or 2.45 GHz. A fourth frequency, 27.125 MHz, has also been assigned. When the 2.45 GHz carrier frequency is used, the range of an RFID chip can be many meters. While this is useful for remote sensing, there may be multiple transponders within the RF field. In order to prevent these devices from interacting and garbling the data, anti-collision schemes are used, as are known in the art. In implementations, the data sensors are integrated with local tracking hardware to transmit their position as they flow within a sealant slurry. The data sensors 110 may form a network using wireless links to neighboring data sensors and have location and positioning capability through, for example, local positioning algorithms as are known in the art. The sensors 110 may organize themselves into a network by listening to one another, therefore allowing communication of signals from the farthest sensors towards the sensors closest to the interrogator to allow uninterrupted transmission and capture of data. In these implementations, the interrogator tool may not need to traverse the entire section of the wellbore containing MEMS sensors in order to read data gathered by such sensors. For example, the interrogator tool may only need to be lowered about half-way along the vertical length of the wellbore containing MEMS sensors. Alternatively or incombination, the interrogator tool may be lowered vertically within the wellbore to a location adjacent to a horizontal arm of a well 106, whereby MEMS sensors 110 may be located in the horizontal arm may be read without the need for the interrogator tool to traverse the horizontal arm. Alternatively or in combination, the interrogator tool may be used at or near the surface and read the data gathered by the sensors distributed along all or a portion of the wellbore. For example, sensors 110 may be located distal to the interrogator may communicate via a network formed by the sensors as described previously.

In some implementations, the MEMS sensors 110 are ultra-small, e.g., 1 $mm^2$, such that they are pumpable in a sealant slurry. In some implementations, the MEMS device 110 can be approximately 1 $\mu m^2$ to 1 $mm^2$, 1 $mm^2$ to 3 $mm^2$, 3 $mm^2$ to 5 $mm^2$, 5 $mm^2$ to 100 $mm^2$, and/or other dimensions. In some implementations, the data sensors 110 may be capable of providing data throughout the cement service life. In implementations, the data sensors 110 can provide data for up to 100 years. In some implementations, the wellbore composition 108 may comprise an amount of MEMS effective to measure one or more desired parameters. In various implementations, the wellbore composition 108 may comprises an effective amount of MEMS such that sensed readings may be obtained at intervals of about 1 foot, 6 inches, 1 inch, and/or other interval along the portion of the wellbore 106 containing the MEMS 110. The MEMS may be present in the wellbore composition 108 in an amount of from about 0.01 to about 50 weight percent.

In some implementations, the MEMS sensors 110 may comprise passive (remain unpowered when not being interrogated) sensors energized by energy radiated from a data interrogator tool. The data interrogator tool may comprise an energy transceiver sending energy (e.g., radio waves) to and receiving signals from the MEMS sensors 110 and a processor processing the received signals. The data interrogator tool may further comprise a memory component, a communications component, or both. The memory component may store raw and/or processed data received from the MEMS sensors 110, and the communications component may transmit raw data to the processor and/or transmit processed data to another receiver, for example located at the surface. The tool components (e.g., transceiver, processor, memory component, and communications component) are coupled together and in signal communication with each other.

In some implementations, one or more of the data interrogator (not illustrated) components may be integrated into a tool or unit that is temporarily or permanently placed downhole (e.g., a downhole module). In some implementations, a removable downhole module comprises a transceiver and a memory component, and the downhole module is placed into the wellbore, reads data from the MEMS sensors, stores the data in the memory component, is removed from the wellbore, and the raw data is accessed. Alternatively or in combination, the removable downhole module may have a processor to process and store data in the memory component, which is subsequently accessed at the surface when the tool is removed from the wellbore. Alternatively or in combination, the removable downhole module may have a communications component to transmit raw data to a processor and/or transmit processed data to another receiver, for example located at the surface. The communications component may communicate via wired or wireless communications. For example, the downhole component may communicate with a component or other node on the surface via a cable or other communications/telemetry device such as a radio frequency, electromagnetic telemetry device or an acoustic telemetry device. The removable downhole component may be intermittently positioned downhole via any suitable conveyance, for example wire-line, coiled tubing, straight tubing, gravity, pumping, etc., to monitor conditions at various times during the life of the well.

In some implementations, the data interrogator tool comprises a permanent or semi-permanent downhole component that remains downhole for extended periods of time. For example, a semi-permanent downhole module may be retrieved and data downloaded once every few years. Alternatively or in combination, a permanent downhole module may remain in the well throughout the service life of well. In an implementation, a permanent or semi-permanent downhole module comprises a transceiver and a memory component, and the downhole module is placed into the wellbore, reads data from the MEMS sensors, optionally stores the data in the memory component, and transmits the read and optionally stored data to the surface. Alternatively or in combination, the permanent or semi-permanent downhole module may have a processor to process and sensed data into processed data, which may be stored in memory and/or transmit to the surface. The permanent or semi-permanent downhole module may have a communications component to transmit raw data to a processor and/or transmit processed data to another receiver, for example located at the surface. The communications component may communicate via wired or wireless communications. For example, the downhole component may communicate with a component or other node on the surface via a cable or other communications/telemetry device such as an radio frequency, electromagnetic telemetry device or an acoustic telemetry device.

In some implementations, the data interrogator tool comprises an RF energy source incorporated into its internal circuitry and the data sensors are passively energized using an RF antenna, which picks up energy from the RF energy source. The data interrogator tool may be integrated with an RF transceiver. In implementations, the MEMS sensors (e.g., MEMS/RFID sensors) are empowered and interrogated by the RF transceiver from a distance, for example a distance of greater than 10 m, or alternatively from the surface or from an adjacent offset well. In some implementations, the data interrogator tool traverses within a casing in the well and reads MEMS sensors located in a sealant (e.g., cement) sheath surrounding the casing and located in the annular space between the casing and the wellbore wall. In some implementations, the interrogator senses the MEMS sensors when in close proximity with the sensors, typically via traversing a removable downhole component along a length of the wellbore comprising the MEMS sensors. In some implementation, close proximity comprises a radial distance from a point within the casing to a planar point within an annular space between the casing and the wellbore. In some implementations, close proximity comprises a distance of 0.1 m to 1 m, 1 m to 5 m, 5 m to 10 m, or other ranges. In implementations, the transceiver interrogates the sensor with RF energy at 125 kHz and close proximity comprises 0.1 m to 0.25 m. Alternatively or in combination, the transceiver interrogates the sensor with RF energy at 13.5 MHz and close proximity comprises 0.25 m to 0.5 m. Alternatively or in combination, the transceiver interrogates the sensor with RF energy at 915 MHz and close proximity comprises 0.5 m to 1 m. Alternatively or in combination, the transceiver interrogates the sensor with RF energy at 2.4 GHz and close proximity comprises 1 m to 2 m.

While the slurry 108 is referred to as a cement slurry, the slurry 108 may include cementitious and/or non-cementitious sealants without departing from the scope of this disclosure. In some implementations, non-cementitious sealants comprise resin based systems, latex based systems, or combinations thereof. In implementations, the sealant comprises a cement slurry with styrene-butadiene latex (e.g., as disclosed in U.S. Pat. No. 5,588,488 incorporated by reference herein in its entirety). Sealants may be utilized in setting expandable casing, which is further described hereinbelow. In some implementations, the sealant can be a cement utilized for primary or secondary wellbore cementing operations, as discussed further hereinbelow.

In some implementations, the sealant 108 can be cementitious and comprises a hydraulic cement that sets and hardens by reaction with water. Examples of hydraulic cements include but are not limited to Portland cements (e.g., classes A, B, C, G, and H Portland cements), pozzolana cements, gypsum cements, phosphate cements, high alumina content cements, silica cements, high alkalinity cements, shale cements, acid/base cements, magnesia cements, fly ash cement, zeolite cement systems, cement kiln dust cement systems, slag cements, micro-fine cement, metakaolin, and combinations thereof. Examples of sealants are disclosed in U.S. Pat. Nos. 6,457,524; 7,077,203; and 7,174,962, each of which is incorporated herein by reference in its entirety. In some implementations, the sealant 108 may comprise a sorel cement composition, which typically comprises magnesium oxide and a chloride or phosphate salt which together form for example magnesium oxychloride. Examples of magnesium oxychloride sealants are disclosed in U.S. Pat. Nos. 6,664, 215 and 7,044,222, each of which is incorporated herein by reference in its entirety.

The wellbore composition 108 (e.g., sealant) may include a sufficient amount of water to form a pumpable slurry. The water may be fresh water or salt water (e.g., an unsaturated aqueous salt solution or a saturated aqueous salt solution such as brine or seawater). In some implementations, the cement slurry 108 may be a lightweight cement slurry containing foam (e.g., foamed cement) and/or hollow beads/microspheres. In some implementations, the MEMS sensors 110 can be incorporated into or attached to all or a portion of the hollow microspheres. Thus, the MEMS sensors 110 may be dispersed within the cement along with the microspheres. Examples of sealants containing microspheres are disclosed in U.S. Pat. Nos. 4,234,344; 6,457,524; and 7,174,962, each of which is incorporated herein by reference in its entirety. In some implementations, the MEMS sensors 110 are incorporated into a foamed cement such as those described in more detail in U.S. Pat. Nos. 6,063,738; 6,367,550; 6,547,871; and 7,174,962, each of which is incorporated by reference herein in its entirety.

In some implementations, additives may be included in the cement composition for improving or changing the properties thereof. Examples of such additives include but are not limited to accelerators, set retarders, defoamers, fluid loss agents, weighting materials, dispersants, density-reducing agents, formation conditioning agents, lost circulation materials, thixotropic agents, suspension aids, or combinations thereof. Other mechanical property modifying additives, for example, fibers, polymers, resins, latexes, and the like can be added to further modify the mechanical properties. These additives may be included singularly or in combination. Methods for introducing these additives and their effective amounts are known to one of ordinary skill in the art.

In regards to the activator implementations, the cement slurry 108 may comprise a "delayed set" cement compositions that remain in a slurry state (e.g., resistant to gelatinizing) for an extended period of time. In such implementations, a delay-set cement slurry 108 may include a cement, a base fluid, and a set retarder. In these and other implementations, activation may change the state of the cement slurry from delay set to neutral, to accelerated, or to less delayed. The cement slurry 108 may include other additives. The delayed-set cement slurry 108 typically remains in a slurry state for in range of about 6 hours to about 7 days under downhole or other conditions. That said, the cement slurry 108 may include components that result in a slurry state for a greater, or shorter, amount of time. For example, the cement slurry 108 may be mixed or otherwise made well ahead of positioning the slurry 108 in the annulus 122. The delayed-set cement slurry 108 can, in some implementations, include a cement, a base fluid, and a set retarder. The delayed-set cement slurry 108 may be set at a desired time, such as after placement, by activating the activation devices 110 to release one or more activators.

In regards to cements included in the cement slurry 108, any cement suitable for use in subterranean applications may be suitable for use in the present invention. For example, delayed-set cement slurry 108 may include a hydraulic cement. In general, hydraulic cements typically include calcium, aluminum, silicon, oxygen, and/or sulfur and may set and harden by reaction with water. Hydraulic cements include, but are not limited to, Portland cements, pozzolanic cements, high aluminate cements, gypsum cements, silica cements, and high alkalinity cements. In addition, the delayed-set cement slurry 108 may include cements based on shale or blast furnace slag. In these instances, the shale may include vitrified shale, raw shale (e.g., unfired shale), and/or a mixture of raw shale and vitrified shale.

In regards to base fluids included in the cement slurry 108, the delayed-set cement slurry 108 may include one or more base fluids such as, for example, an aqueous-based base fluid, a nonaqueous-based base fluid, or mixtures thereof. Aqueous-based may include water from any source that does not contain an excess of compounds (e.g., dissolved organics, such as tannins) that may adversely affect other compounds in the cement slurry 108. For example, the delayed-set cement slurry 108 may include fresh water, salt water (e.g., water containing one or more salts), brine (e.g., saturated salt water), and/or seawater. Nonaqueous-based may include one or more organic liquids such as, for example, mineral oils, synthetic oils, esters, and/or others. Generally, any organic liquid in which a water solution of salts can be emulsified may be suitable for use as a base fluid in the delayed-set cement slurry 108. In some implementations, the base fluid exceeds a concentration sufficient to form a pumpable slurry. For example, the base fluid may be water in an amount in the range of from about 25% to about 150% by weight of cement ("bwoc") such as one or more of the following ranges: about 30% to about 75% bwoc; about 35% to about 50% bwoc; about 38% to about 46% bwoc; and/or others.

In regards to set retarders in the cement slurry 108, the cement slurry 108 may include one or more different types of set retarders such as, for example, phosphonic acid, phosphonic acid derivatives, lignosulfonates, salts, organic acids, carboxymethylated hydroxyethylated celluloses, synthetic co- or ter-polymers comprising sulfonate and carboxylic acid groups, and/or borate compounds. In some implementations, the set retarders used in the present invention are phosphonic acid derivatives. Examples of set retarders may include phosphonic acid derivatives commercially available from, for example, Solutia Corporation of St. Louis, Mo. under the trade name "DEQUEST." Another example set retarder may include a phosphonic acid derivative commercially available from Halliburton Energy Services, Inc., under the trade name "MICRO MATRIX CEMENT RETARDER." Example borate compounds may include sodium tetraborate, potassium pentaborate, and/or others. A commercially available example of a suitable set retarder comprising potassium pentaborate is available from Halliburton Energy Services, Inc. under the trade name "Component R." Example organic acids may include gluconic acid, tartaric acid, and/or others. An example of a suitable organic acid may be commercially available from Halliburton Energy Services, Inc. under the trade name "HR® 25." Other examples of set retarders may be commercially available from Halliburton Energy Services, Inc. under the trade names "SCR-100" and "SCR-500." Generally, the set retarder in the delayed-set cement slurry 108 may be in an amount sufficient to delay the setting in a subterranean formation for a specified time. The amount of the set retarder included in the cement slurry 108 may be in one or more of the following ranges: about 0.1% to about 10% bwoc; about 0.5% to about 4% bwoc; and/or others.

In some implementations, the cement slurry 108 may not include a set retarder. For example, the system slurry 108 may include high aluminate cements and/or phosphate cements independent of a set retarder. In these instances, the activators may initiate setting of the slurry 108. For example, these activators may include alkali metal phosphate salts. High aluminate cement may comprise calcium aluminate in an amount in the range of from about 15% to about 45% by weight of the high aluminate cement, Class F fly ash in an amount in the range of from about 25% to about 45% by weight of the high aluminate cement, and sodium polyphosphate in an amount in the range of from about 5% to about 15% by weight of the high aluminate cement. In certain implementations of the present invention wherein a cement composition comprising a phosphate cement is used, a reactive component of the cement composition (e.g., the alkali metal phosphate salt) may be used as an activator.

FIGS. 2A and 2B illustrate a cross sectional view of the well system 100 including set cement 202 in at least a portion of the annulus 122. In particular, the activation devices 110 released activators in at least a portion of the cement slurry 108 to form the set cement 202. In FIG. 2A, the cement slurry 108 flowed into the annulus 122 through the tubing string 116, and in response to at least a signal, the activation devices 110 in the slurry 108 released an activator. In the illustrated example, substantially all devices 110 in the annulus 122 released activators to form the set cement 202 along substantially the entire length of the annulus 122. Referring to FIG. 2B, the cement slurry 108 flowed into the annulus 122 through the tubing string 116, and in response to at least a signal, the activation devices 110 in the slurry 108 released activators within a specified location 204. In the illustrated example, the region or location 204 is located proximate the zone 102. In other words, the activation devices 110 proximate the zone 102 may release activators and form the set cement 202 located in the region 204. The activation signal may be localized to the region identified by 204, and in response to at least the localized signal, the set cement 204 forms. In some implementations, an initial amount of the cement slurry 108 may be exposed to an activation signal such that the setting period may be substantially equal to a period of time for the setting cement slurry 108 to flow to the location 204. In these examples, the cement slurry 108 may be exposed to the activation signal as the slurry 108 including the devices 110 enters the tubing string 116. As the leading edge of cement slurry 108 begins to set, fluid flow through the annulus 122 may become more restricted and may eventually ceases. Thus, the cement slurry 108 may be substantially prevented from flowing onto the surface 112 through the annulus 122. The remainder of the cement slurry 108 may set in the annulus 122 behind the leading edge as illustrated in FIG. 2A or the cement slurry 108 may set at a later time as illustrated in FIG. 2B. In the later, the remaining cement slurry 108 may be exposed to activation signals at a later time to initiate or accelerate the setting processes.

FIG. 3 illustrates an example activator device 110 of FIG. 1 in accordance with some implementations of the present disclosure. In these implementations, the activator device 110 releases one or more stored activators in response to at least a wireless signal. The illustrated device 110 is for example purposes only, and the device 110 may include some, none, or all of the illustrated elements without departing from the scope of this disclosure.

As illustrated, the activator device 110 includes a substrate 302 and a passivation layer 304 formed on the substrate 302. The passivation layer 304 includes or is otherwise adjacent an activator module 306 for releasing activators, a transducer 308 for receiving wireless signals, logic 310 for controlling the activator module 306, and a power module 312 for supplying power to the device 110. The substrate 302 may provide a mechanical structure to support the device elements and/or a surface for routing electrical and/or fluidic signals. The substrate 302 may be silicon, quartz, glass, organic (e.g., kapton tape or other flexible material), FR-4, duroid, and/or other materials. In some implementations, the passivation layer 304 can protect one or more modules from the surrounding cement slurry 108 and/or may provide direct access to the cement slurry 108 to, for example, release the activators.

The activator module 306 may release one or more activators to initiate or accelerate the setting of the cement slurry 108. In some implementations, the activator module 306 may receive one or more signals from the logic 310 and execute a process to initiate a reaction with, for example, the cement slurry 108. The activator module 306 may include a membrane or other element that encloses the activators. In these examples, the activator module 306 may move, remove, or otherwise open the element to release the activators into the cement slurry 108. The activator module 306 may include a heating element in the enclosing element that encloses a unitary chemical, a binary chemical set with a rupture membrane, unitary chemical with a rupture membrane, and/or other configures that release enclosed activators. The transducer 308 may convert external stimulus into one or more transduction signals that are processed by the logic 310. For example, the transducer 308 may detect signals such as ultrasonic, pressure, magnetic, electric, electromagnetic (e.g., RF, infrared, x-rays), acoustic, optical, VCF, nuclear (e.g., gamma, alpha, beta, neutron), and/or other signals.

The logic 310 may generate voltages for operating the activator module 306 using the power module 312 and in response to at least the transducer signal. For example, the logic 310 may dynamically switch between a "go" and a "no go" state in response to at least the transducer signals. In some implementations, the logic 310 may execute one or more of the following: receive power from the power module 312; receive one or more transducer signals from the transducer 308; generate one or more signals for the activator module 306 using the received power; transmit one or more signals to the activator module 306 to activate the release of one or more activators; and/or other processes. The logic 310 may be complementary metal-oxide-semiconductor (CMOS), Transistor-transistor logic (TTL), bipolar, Radio Frequency (RF), and/or other type of device. The power module 312 provides power to the device 110. For example, the power module 312 may be a voltage generator that provides sufficient current to operate the logic 310. The power module 312 may be a battery in thin and/or thick film, components of a battery, one or more capacitors, one or more induction pick-up coils, and/or other elements that store power.

Figure 4B:
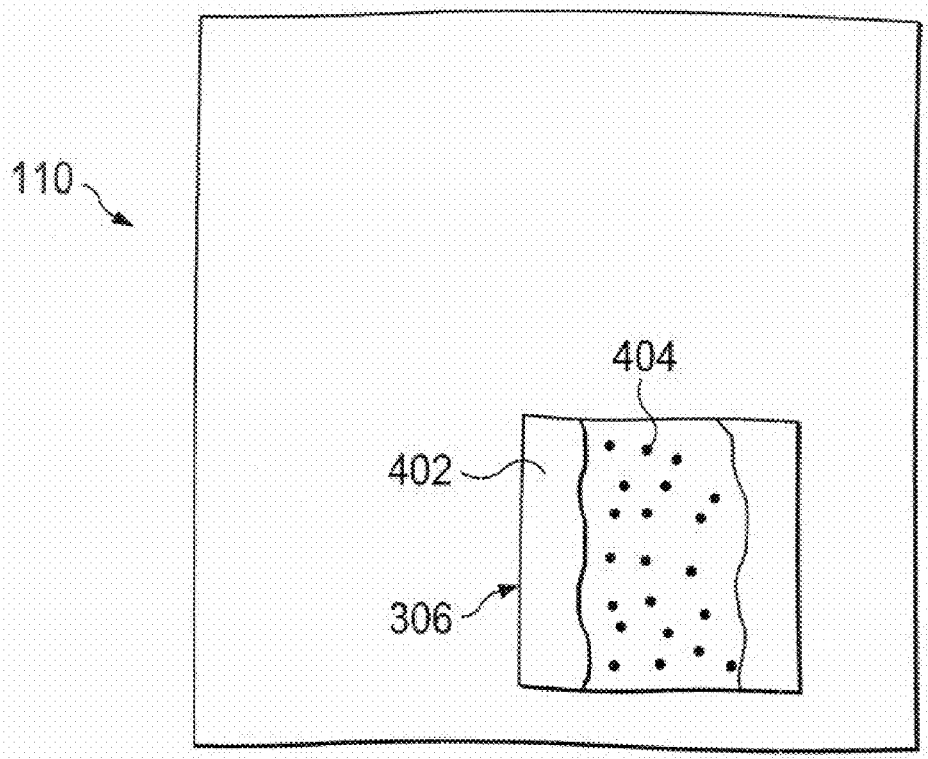
Figure 4C:
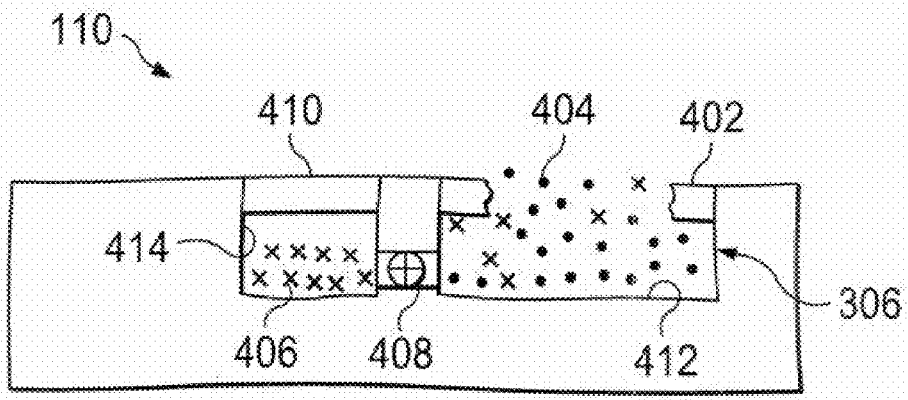

FIGS. 4A-C illustrate example implementations of the activator devices 110 releasing one or more activators. In these implementations, the device 110 may comprise an acoustic trigger MEMS for controlled delivery of on command additives into a cement slurry. The devices 110 may enable cement properties to be tailored once the cement slurry has been pumped downhole (e.g., retarded, accelerated in situ). The devices 110 may release activators by moving one or more elements, resistively heating one or more elements to form at least one opening, chemically etching away one or more elements, and/or other processes. In some implementations, each device 110 may re-transmit the activation signals to other devices 110. The following implementations are for illustration purposes only, and the devices 110 may release activators using some, all or none of these processes.

Referring to FIG. 4A, the activator device 110 mechanically moves the element 402 to release the activators 404. In some implementations, the device 110 may include a MEM device that encloses the activators 404 when the element 402 is in a first position. In response to at least a signal, the element 402 may rotate about an axis to a second position that releases the activators 404 into the cement slurry 108. In some implementations, the activation signal may directly move the element 402. For example, the activation signal may structurally change the form of the element 402 through, for example, an ultrasonic signal. In some implementations, the device 110 may switch the element 402 between the two positions at a specified frequency to assist or otherwise increase the dispersion rate of the activators 404 into the cement slurry 108. Referring to FIG. 4B, the activator device 110 resistively heats the element 402 to form an opening that releases the activators 404. For example, the element 402 may be a gold membrane including a tungsten filament that generates heat from an applied current. In these instances, the generated heat may melt or otherwise deform the membrane to form an opening that releases the activators 404. In addition to metal membranes, the element 402 may be other materials such as a polymer. Referring to FIG. 4C, the device 110 includes the activators 404 and release chemicals 406 that remove at least a portion of the element 402 to release the activators. In the illustrated example, the device 110 includes a first reservoir 412 enclosing the activators 404 and a second reservoir 414 enclosing the release chemicals 406 using a retaining element 410. The first reservoir 412 and the second reservoir 414 may be configured to fluidly communicate case through the valve system 408. In a first position, the valve system 408 may be substantially prevent the flow of the release chemicals 406 into the first reservoir 412. In the second position, the release chemicals 406 may flow from the second reservoir 414 to the first reservoir 412 through the valve system 408. In the illustrated implementation, the release chemicals 406 reacts with the element 402 to form an opening that releases the activators 404 into the cement slurry 108. For example, the release chemicals 406 may etch or otherwise dissolve the element 402.

Figure 5:
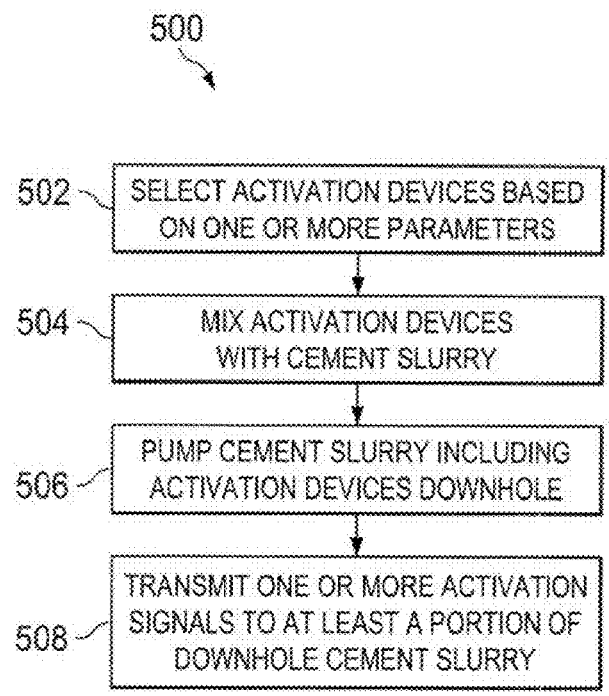
FIG. 5 is a flow chart illustrating an example method for activating deposited cement slurry.
Figure 6:
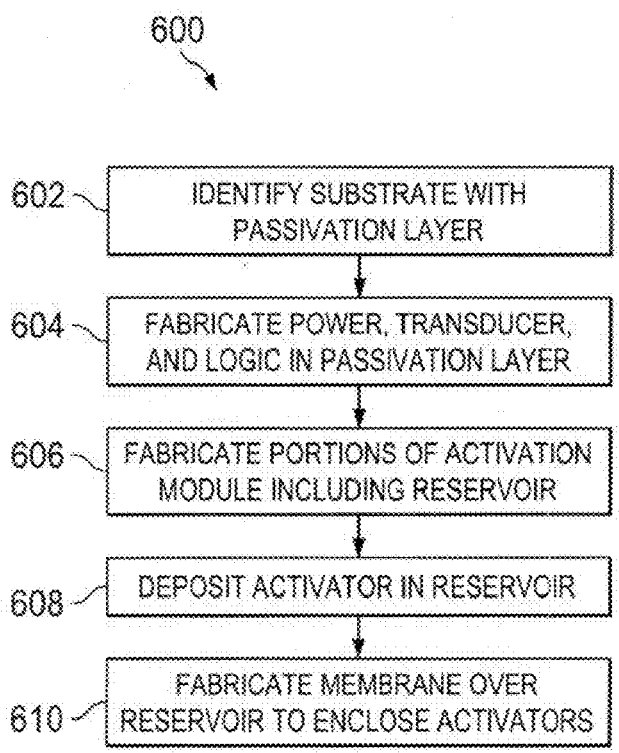
FIG. 6 is a flow chart illustrating an example method for fabricating activation devices.

FIGS. 5 and 6 are flow diagrams illustrating example methods 500 and 600 for implementing and manufacturing devices including one or more activators. The illustrated methods are described with respect to well system 100 of FIG. 1, but these methods could be used by any other system. Moreover, well system 100 may use any other techniques for performing these tasks. Thus, many of the steps in these flowcharts may take place simultaneously and/or in different order than as shown. The well system 100 may also use methods with additional steps, fewer steps, and/or different steps, so long as the methods remain appropriate.

Referring to FIG. 5, method 500 begins at step 502 where activation devices are selected based, at least in part, on one or more parameters. For example, the activation devices 110 and the enclosed activators may be based, at least in part, on components of the cement slurry 108. In some implementations, the activation devices 110 may be selected based on downhole conditions (e.g., temperature). At step 504, the selected activation devices are mixed with a cement slurry. In some examples, the activation devices 110 may be mixed with the cement slurry 108 as the truck 130 pumps the slurry into the annulus 122. In some examples, the activation devices 110 may be mixed with dry cement prior to generating the cement slurry 108. Next, at step 506, the cement slurry including the activation devices are pumped downhole. In some instances, the cement slurry 108 including the activation devices 110 may be pumped into the annulus 122 at a specified rate. One or more activation signals are transmitted to the at least a portion of the downhole cement slurry at step 508. Again in the example, the transmitter may be lowered into the casing to transmit signals at a portion of the cement slurry 108. In this example, the transmitted signals may activate the devices 110 proximate the shoe 140 to set that portion of the cement slurry 108 as illustrated in FIG. 2B. In some instances, the tubing string 116 may be moved (e.g., up/down) to assist in distributing the activators as desired.

Referring to FIG. 6, the method 600 begins at step 602 where a substrate with a passivation layer is identified. For example, the substrate 302 including the passivation layer 304 of FIG. 3 may be identified. At step 604 and 606, the power, transducer, and logic modules and at least a portion of the activation module are fabricated. A reservoir in the activation module is also fabricated. In the example, the transducer 308, the logic 310, the power module 312, and at least a portion of the activation module 306 is fabricated. In this example, a reservoir for enclosing at least a portion of the activators such as the reservoirs illustrated in FIGS. 4A-C. At step 608, activators are deposited in the reservoir. As for the example, the activators 404 may be deposited in the reservoirs illustrated in FIGS. 4A-C. Next, at step 610, a membrane is fabricated over the reservoir to substantially enclose the activators. Again in the example, the element 402 may be fabricated to enclose the activators 404 in the reservoir.

Figure 7:
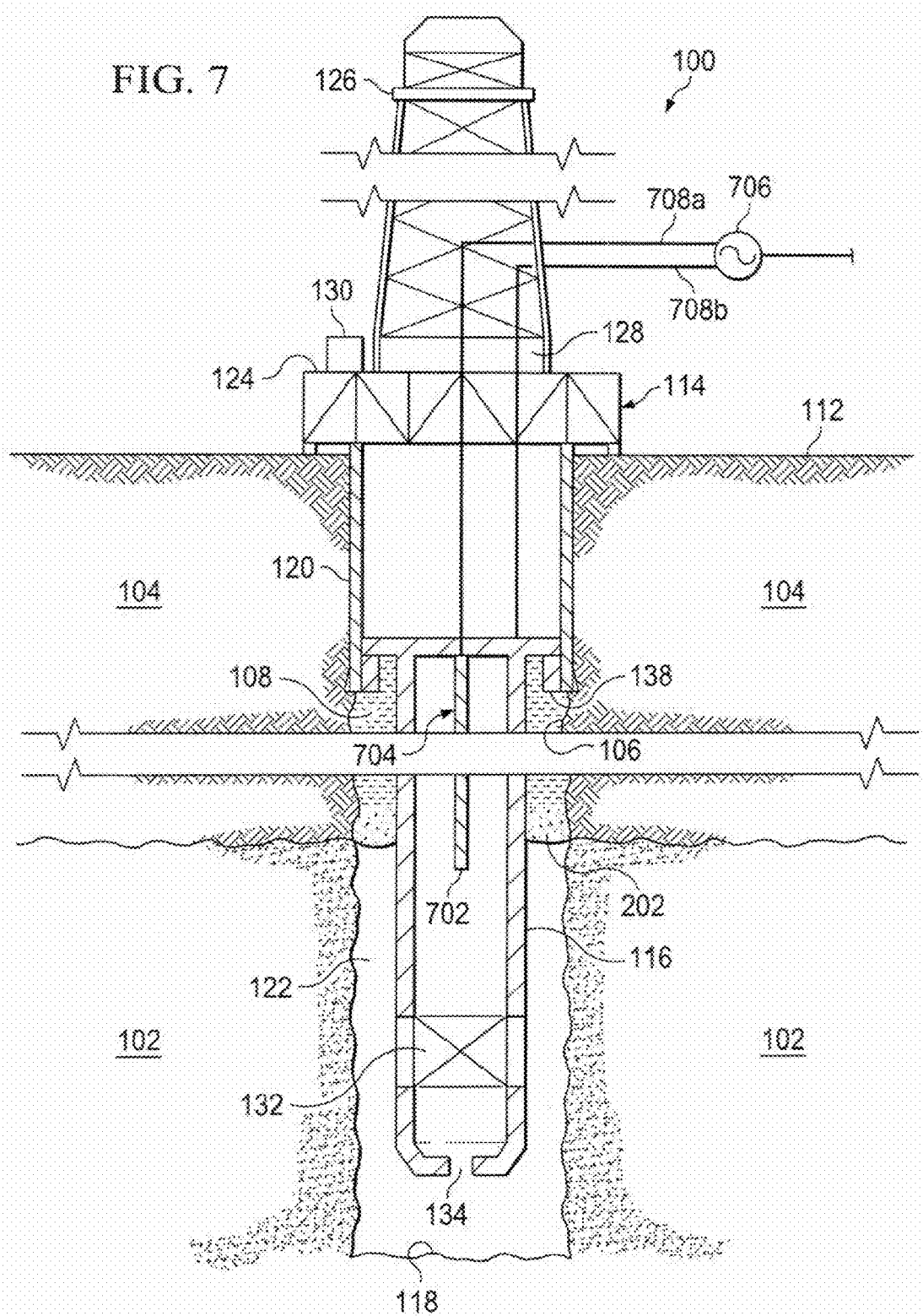
FIG. 7 is an example well system for transmitting activation signals to the cement slurry.

FIG. 7 illustrates an example well system 100 in connection with transmitting activation signals to the cement slurry 122. For example, the system 100 may wireless transmit electromagnetic signals to the cement slurry 108 including a request to release activators in the cement slurry 108. In the illustrated example, the system 100 includes an interior medium 702 and a signal source 706 connected to the interior medium 702 and the tubing string 116 through the connections 708a and 708b, respectively. The connections 708 may be ohmic contacts, capacitively coupled, and/or others. In some implementations, the tubing string 116 may be a "hot patch" for signals. For example, the tubing string 116 may be a continuous metal path or a metal path with a finite number of discontinuities. In the later, each portion may result in a modest step attenuation. In addition, the interior medium 702 may be at least partially enclosed in one or more shells or interior pipe 704.

In some implementation, the system 100 may enable signal transduction down a long pipe using leaky feeder principles (LP-LF). In these cases, the system 100 may transducer a signal using one or more of the following: the tubing string 116; the surface casing 124; and/or one or more interior pipes 704. The surface tubing string 116 may have a length of 100 m or greater. The interior pipe 704 may have a length of 100 m or less. The interior medium 702 may be metal, air, and/or a liquid. In some implementations, the surface tubing string 116 and/or the interior pipe 704 may be used as an additional hot path that is out of phase with the casing signal and/or a different signaling waveform. The signal source 706 can be any hardware, software and/or firmware that generates an electrical signal. A connection between the signal source 706 and the tubing string 116 may include return paths through one or more of the following: the cement slurry 108; the surface casing 120; the non-production zone 104; the interior medium 702; shells of the pipe 704; and/or others. The cement slurry 108 may be very basic (e.g., pH 13) and a loss medium that attenuates the return signal. The signal source 706 may produce time-varying voltages that are propagated down conduits such as the tubing string 116. The signal source 706 may propagate one or more of the following frequencies: Ultra Low Frequency (ULF) such as 0.1 Hz to 10 Hz; Very low frequency (VLF) such as 10 Hz to 30 kHz; Low Frequency (LF) such as 30 kHz to 30 MHz; High Frequency (HF) such as 3 MHz to 30 MHz; Very High Frequency (VHF) such as 30 MHz to 300 MHz; and/or Ultra High Frequency (UHF) such as greater than 300 MHz. In some implementations, the signal source 706 may produce on-off keying (OOK) cod of 12 bits with a baud rate of 4800 and $f_{center}$=13.5 MHz. In these implementations, the signal source 706 may directly drives the tubing string 116 and drive the surface casing 120 180° out of phase. In addition, the interior pipe 704 may not be driven and the connections 706 may be capacitively coupled.

Figure 8A:
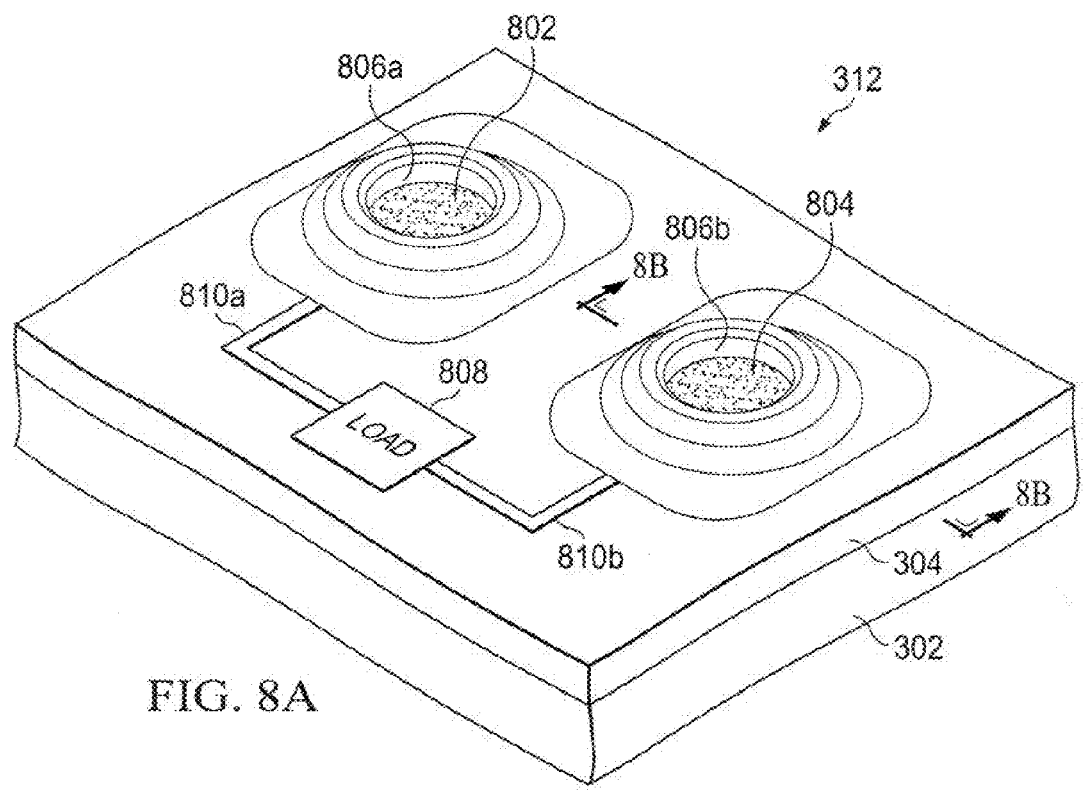
FIGS. 8A and 8B illustrated an example power module for activation devices in a cement slurry.
Figure 8B:
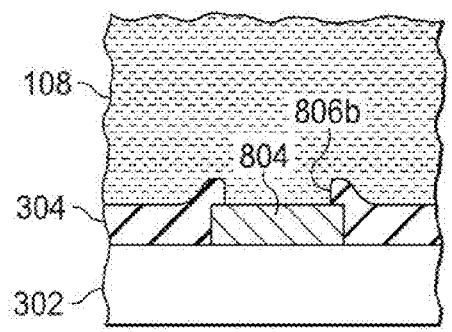

FIGS. 8A and 8B illustrated an example power module 312 of FIG. 3 in accordance with some implementations of the present disclosure. In the illustrated implementation, the power module 312 can use an alkaline or acidic environment generated by, for example, the cement slurry 108. In these instances, the power module 312 may generate a voltage difference using the cement slurry 108 and independent of storing power using, for example, a battery or capacitor. In some implementations, the power module 312 may be fabricated using thin and/or thick film photolithography techniques to create sub-millimeter (sub-mm) scale batteries. The example power module 312 is for illustration purposes only, and the module 312 may include some, all or none of the illustrated elements without departing from the scope of this disclosure.

The illustrated power module 312 includes a first metallic element 802 and a second metallic element 804 that form the terminals of the power module 312. In this case, the first metallic element 802 and the second metallic element 804 react with the surrounding cement slurry 108 to generate a voltage different between the two terminals. The first metallic element 802 and the second metallic element 804 are at least partially enclosed by the passivation layer 304 and the substrate 302. As previously discussed, the substrate 302 may comprise silicon, glass, sapphire, organic flexible material, and/or other materials. The passivation layer 304 includes a first aperture 806a that exposes at least a surface or portion of the first metallic element 802 and a second aperture 806b that exposes at least a surface or portion of the second metallic element 804. By exposing the first metallic element 802 and the second metallic element 804, a voltage difference is generated between these terminals. In addition, this voltage difference supplies power to the load 808 such as the logic 310. The terminal are connected to the load 808 through the leads 810a and 810b. The apertures 806a and 806b may be formed, for example, by photolithography or a thick film printing process. In some implementations, the substrate 302 may be silicon and about 1 mm by 1 mm by 100 μm, and the cement slurry 108 may be in a pre-cured wet state. In these implementations, the first metallic element 802 may be a metal such as zinc, and the second metallic element 804 may be a metallic salt such as manganese dioxide. The elements 802 and 804 may be deposited using thick film screening printing and may be each about 150 μm by 150 μm by 50 μm. Again in these implementations, the apertures 806a and 806b may be 100 μm by 100 μm, and the layer 304 may be photoimageable BCB. The leads or connections 810a and 810b may be thin film metallizations.

Figure 9:
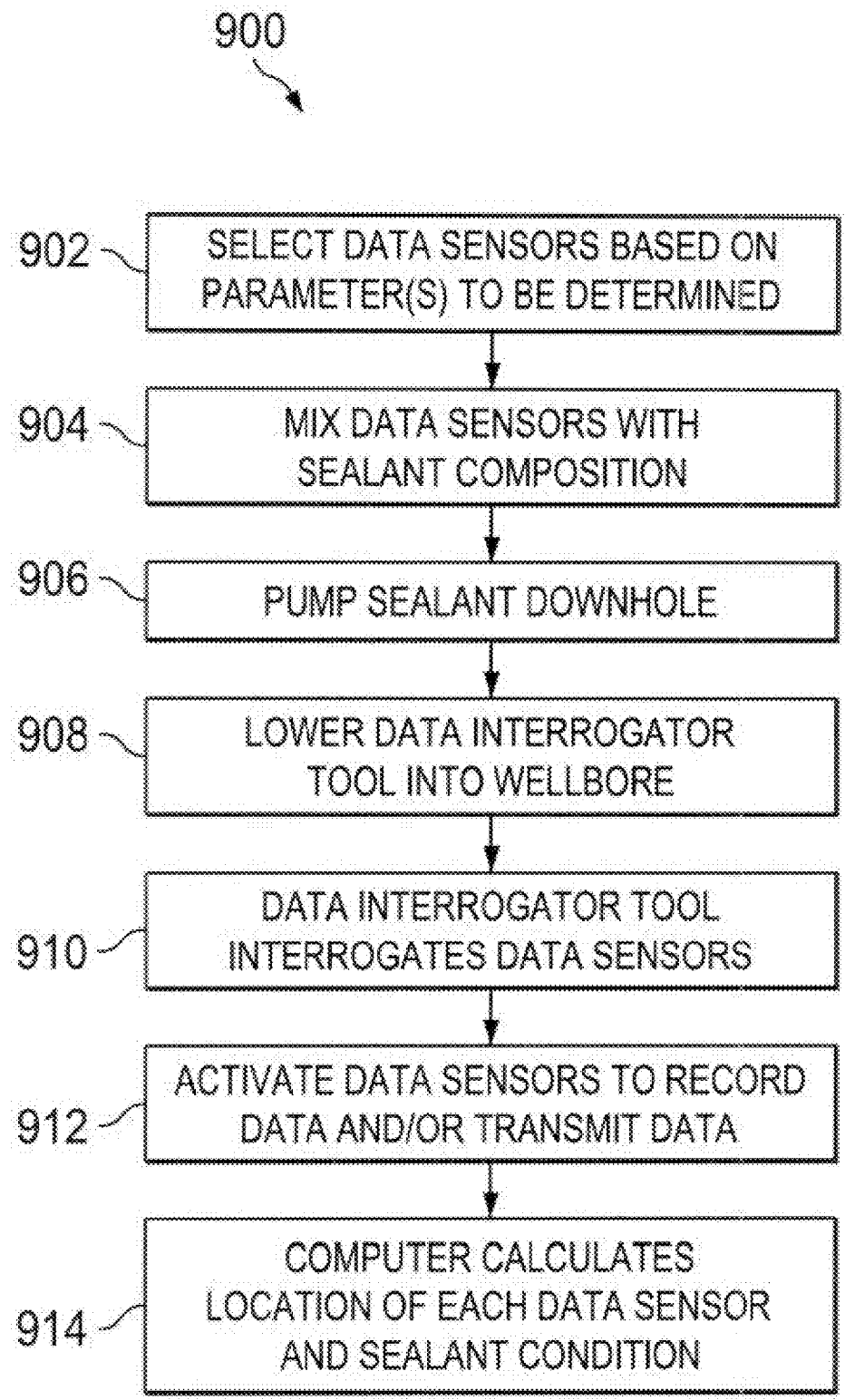
FIG. 9 is a flowchart illustrating an implementation of a method in accordance with the present disclosure.
Figure 10:
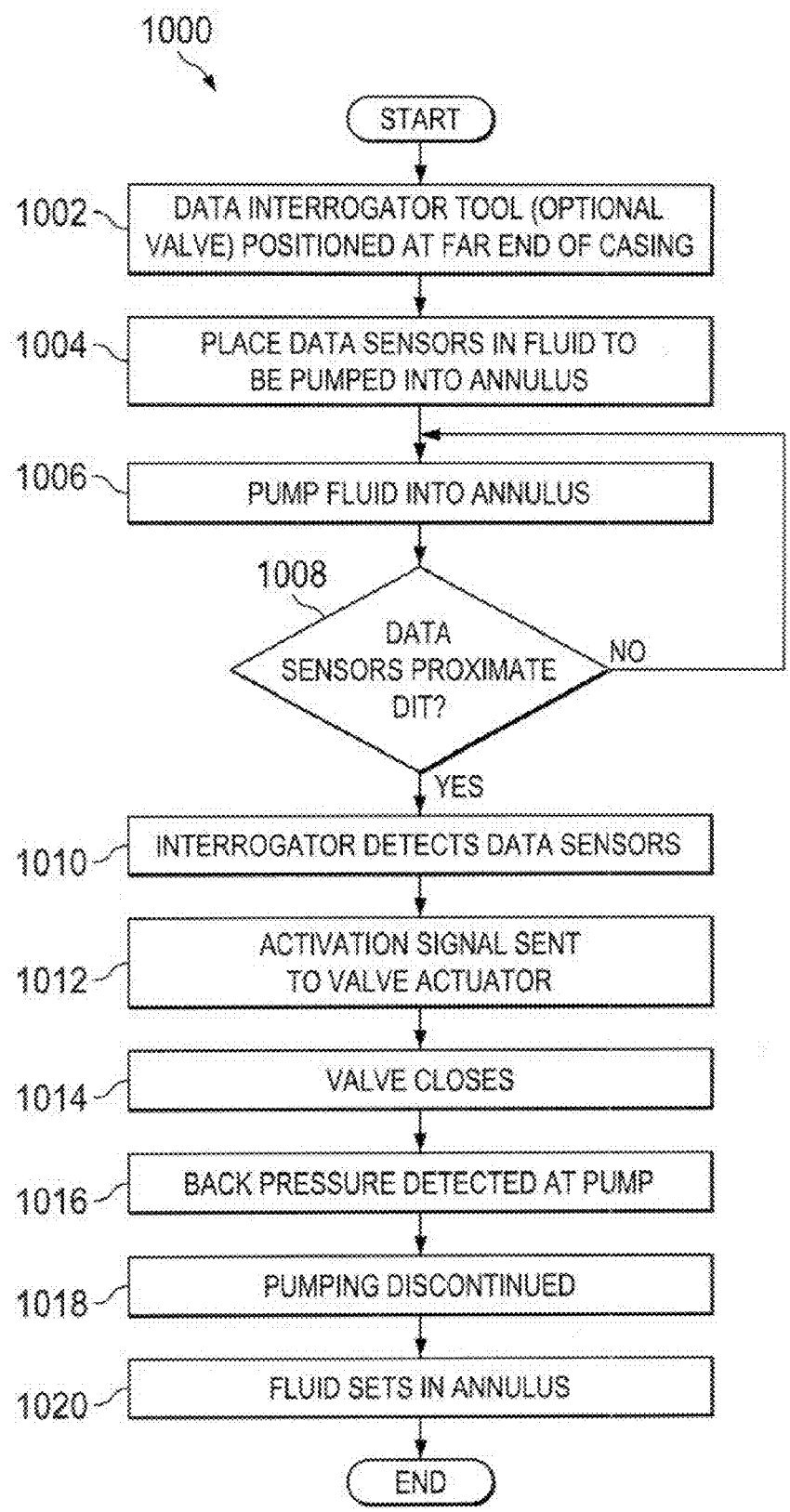
FIG. 10 is a flowchart detailing a method for determining when a reverse cementing operation is complete and for subsequent optional activation of a downhole tool.
Figure 11:
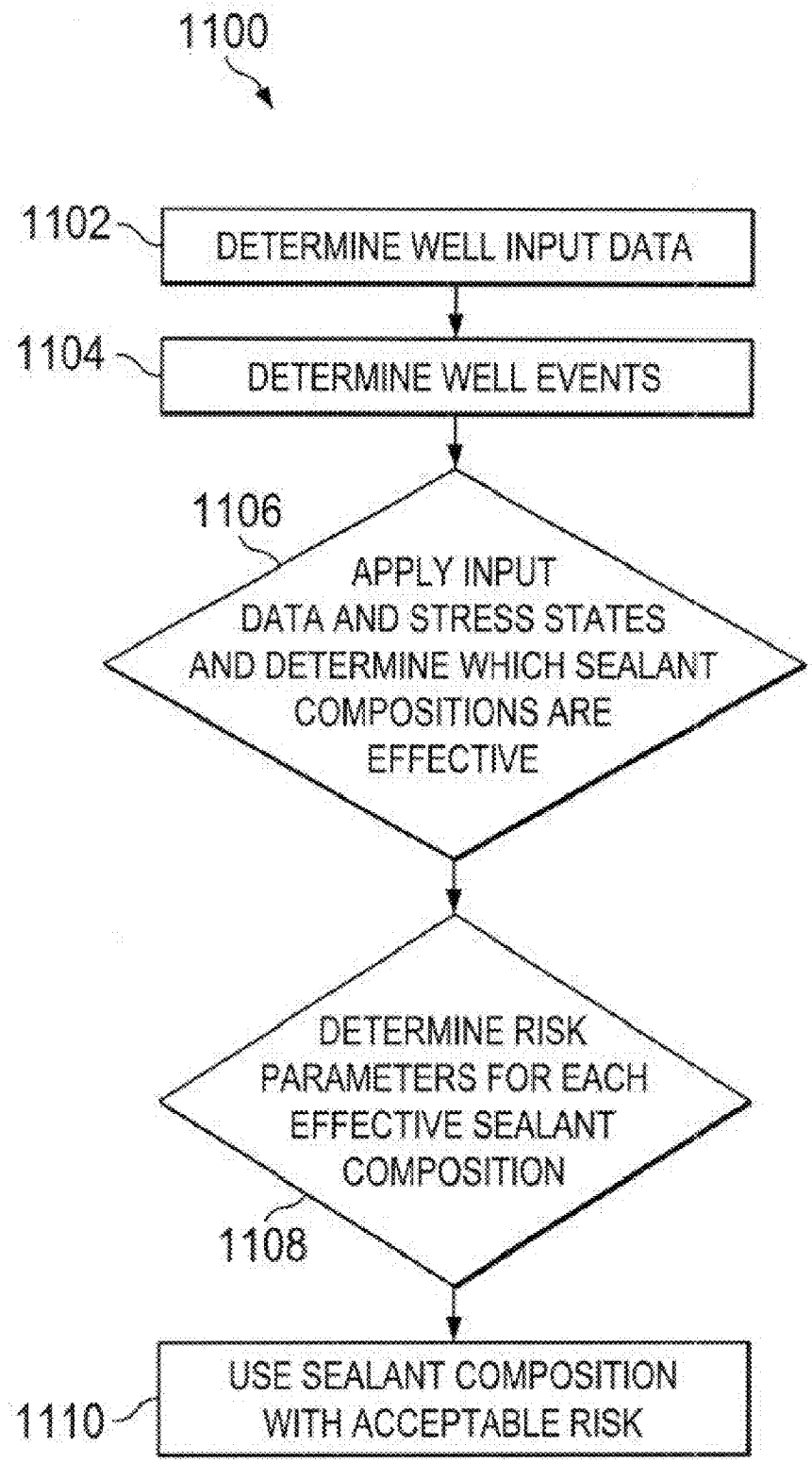
FIG. 11 is a flowchart of a method for selecting between a group of sealant compositions according to one implementation of the present disclosure.

Referring to FIGS. 9-11, methods for detecting and/or monitoring the position and/or condition of wellbore compositions are illustrated such as, for example, sealant conditions (e.g., cement) using MEMS-based data sensors 110, previously discussed with respect to FIG. 1. Still more particularly, the present disclosure describes methods of monitoring the integrity and performance of wellbore compositions over the life of the well using MEMS-based data sensors. Performance may be indicated by changes, for example, in various parameters, including, but not limited to, moisture content, temperature, pH, and various ion concentrations (e.g., sodium, chloride, and potassium ions) of the cement. In implementations, the methods comprise the use of embeddable data sensors 110 capable of detecting parameters in a wellbore composition 108, for example a sealant such as cement. In some implementations, the methods provide for evaluation of sealant 108 during mixing, placement, and/or curing of the sealant 108 within the wellbore 106. In some implementations, the method can be used for sealant evaluation from placement and curing throughout its useful service life, and where applicable to a period of deterioration and repair. In implementations, the methods of this disclosure may be used to prolong the service life of the sealant, lower costs, and/or enhance creation of improved methods of remediation. Additionally, methods may be used to determine the location of sealant 108 within a wellbore 106, such as for determining the location of a cement slurry 108 during primary cementing of a wellbore 106 as discussed further hereinbelow.

The methods disclosed herein comprise the use of various wellbore compositions 108, including sealants and other wellbore servicing fluids. As used herein, "wellbore composition" includes any composition that may be prepared or otherwise provided at the surface and placed down the wellbore 106, typically by pumping. As used herein, a "sealant" refers to a fluid used to secure components within a wellbore or to plug or seal a void space within the wellbore 106. Sealants 108, and in particular cement slurries and non-cementitious compositions, are used as wellbore compositions in several implementations described herein, and it is to be understood that the methods described herein are applicable for use with other wellbore compositions. As used herein, "servicing fluid" refers to a fluid used to drill, complete, work over, fracture, repair, treat, or in any way prepare or service a wellbore 106 for the recovery of materials residing in a subterranean formation 102 penetrated by the wellbore 106. Examples of servicing fluids include, but are not limited to, cement slurries, non-cementitious sealants, drilling fluids or muds, spacer fluids, fracturing fluids or completion fluids, all of which are well known in the art. The servicing fluid is for use in a wellbore 106 that penetrates a subterranean formation 102. It is to be understood that "subterranean formation" encompasses both areas below exposed earth and areas below earth covered by water such as ocean or fresh water. The wellbore 106 may be a substantially vertical wellbore and/or may contain one or more lateral wellbores, for example as produced via directional drilling. As used herein, components are referred to as being "integrated" if they are formed on a common support structure placed in packaging of relatively small size, or otherwise assembled in close proximity to one another.

Referring to FIG. 9, method 900 is an example method of placing MEMS sensors in a wellbore and gathering data. At block 902, data sensors are selected based on the parameter(s) or other conditions to be determined or sensed within the wellbore. At block 904, a quantity of data sensors is mixed with a wellbore composition, for example a sealant slurry. In some implementations, data sensors are added to a sealant by any methods known to those of skill in the art. For example, the sensors may be mixed with a dry material, mixed with one more liquid components (e.g., water or a non-aqueous fluid), or combinations thereof. The mixing may occur onsite, for example addition of the sensors into a bulk mixer such as a cement slurry mixer. The sensors may be added directly to the mixer, may be added to one or more component streams and subsequently fed to the mixer, may be added downstream of the mixer, or combinations thereof. In some implementations, data sensors can be added after a blending unit and slurry pump, for example, through a lateral by-pass. The sensors may be metered in and mixed at the well site, or may be pre-mixed into the composition (or one or more components thereof) and subsequently transported to the well site. For example, the sensors may be dry mixed with dry cement and transported to the well site where a cement slurry is formed comprising the sensors. Alternatively or additionally, the sensors may be pre-mixed with one or more liquid components (e.g., mix water) and transported to the well site where a cement slurry is formed comprising the sensors. The properties of the wellbore composition or components thereof may be such that the sensors distributed or dispersed therein do not substantially settle during transport or placement.

The sealant slurry is then pumped downhole at block 906, whereby the sensors are positioned within the wellbore. For example, the sensors may extend along all or a portion of the length of the wellbore adjacent the casing. The sealant slurry may be placed downhole as part of a primary cementing, secondary cementing, or other sealant operation as described in more detail herein. At block 908, a data interrogator tool is positioned in an operable location to gather data from the sensors, for example lowered within the wellbore proximate the sensors. At block 910, the data interrogator tool interrogates the data sensors (e.g., by sending out an RF signal) while the data interrogator tool traverses all or a portion of the wellbore containing the sensors. The data sensors are activated to record and/or transmit data at block 912 via the signal from the data interrogator tool. At block 914, the data interrogator tool communicates the data to one or more computer components (e.g., memory and/or microprocessor) that may be located within the tool, at the surface, or both. The data may be used locally or remotely from the tool to calculate the location of each data sensor and correlate the measured parameter(s) to such locations to evaluate sealant performance.

Referring back to FIG. 1, during cementing, or subsequent the setting of cement, a data interrogator tool may be positioned in wellbore 106, as at block 908 of FIG. 9. For example, the wiper may be equipped with a data interrogator tool and may read data from the MEMS while being pumped downhole and transmit same to the surface. Alternatively or in combination, an interrogator tool may be run into the wellbore following completion of cementing a segment of casing, for example as part of the drill string during resumed drilling operations. Alternatively or in combination, the interrogator tool may be run downhole via a wireline or other conveyance. The data interrogator tool may then be signaled to interrogate the sensors (block 910 of FIG. 9) whereby the sensors are activated to record and/or transmit data, block 912 of FIG. 9. The data interrogator tool communicates the data to a processor 914 whereby data sensor (and likewise cement slurry) position and cement integrity may be determined via analyzing sensed parameters for changes, trends, expected values, etc. For example, such data may reveal conditions that may be adverse to cement curing. The sensors may provide a temperature profile over the length of the cement sheath, with a uniform temperature profile likewise indicating a uniform cure (e.g., produced via heat of hydration of the cement during curing) or a cooler zone might indicate the presence of water that may degrade the cement during the transition from slurry to set cement. Alternatively or in combination, such data may indicate a zone of reduced, minimal, or missing sensors, which would indicate a loss of cement corresponding to the area (e.g., a loss/void zone or water influx/washout). Such methods may be available with various cement techniques described herein such as conventional or reverse primary cementing.

Due to the high pressure at which the cement is pumped during conventional primary cementing (pump down the casing and up the annulus), fluid from the cement slurry may leak off into existing low pressure zones traversed by the wellbore. This may adversely affect the cement, and incur undesirable expense for remedial cementing operations (e.g., squeeze cementing as discussed hereinbelow) to position the cement in the annulus. Such leak off may be detected via the present disclosure as described previously. Additionally, conventional circulating cementing may be time-consuming, and therefore relatively expensive, because cement is pumped all the way down tubing string 116 and back up annulus 122.

One method of avoiding problems associated with conventional primary cementing is to employ reverse circulation primary cementing. Reverse circulation cementing is a term of art used to describe a method where a cement slurry is pumped down casing annulus 122 instead of into tubing string 116. The cement slurry displaces any fluid as it is pumped down annulus 122. Fluid in the annulus is forced down annulus 122, into tubing string 116 (along with any fluid in the casing), and then back up to earth's surface 112. When reverse circulation cementing, casing shoe 132 comprises a valve that is adjusted to allow flow into the tubing string 116 and then sealed after the cementing operation is complete. Once slurry is pumped to the bottom of the tubing string 116 and fills annulus 122, pumping is terminated and the cement is allowed to set in annulus 122. Examples of reverse cementing applications are disclosed in U.S. Pat. Nos. 6,920,929 and 6,244,342, each of which is incorporated herein by reference in its entirety.

In some implementations of the present disclosure, sealant slurries comprising MEMS data sensors are pumped down the annulus in reverse circulation applications, a data interrogator is located within the wellbore (e.g., integrated into the casing shoe) and sealant performance is monitored as described with respect to the conventional primary sealing method disclosed hereinabove. Additionally, the data sensors of the present disclosure may also be used to determine completion of a reverse circulation operation, as further discussed hereinbelow.

Secondary cementing within a wellbore may be carried out subsequent to primary cementing operations. A common example of secondary cementing is squeeze cementing wherein a sealant such as a cement composition is forced under pressure into one or more permeable zones within the wellbore to seal such zones. Examples of such permeable zones include fissures, cracks, fractures, streaks, flow channels, voids, high permeability streaks, annular voids, or combinations thereof. The permeable zones may be present in the cement column residing in the annulus, a wall of the conduit in the wellbore, a microannulus between the cement column and the subterranean formation, and/or a microannulus between the cement column and the conduit. The sealant (e.g., secondary cement composition) sets within the permeable zones, thereby forming a hard mass to plug those zones and prevent fluid from passing therethrough, i.e., substantially prevents communication of fluids between the wellbore and the formation via the permeable zone. Various procedures that may be followed to use a sealant composition in a wellbore are described in U.S. Pat. No. 5,346,012, which is incorporated by reference herein in its entirety. In various implementations, a sealant composition comprising MEMS sensors is used to repair holes, channels, voids, and microannuli in casing, cement sheath, gravel packs, and the like as described in U.S. Pat. Nos. 5,121,795; 5,123,487; and 5,127,473, each of which is incorporated by reference herein in its entirety.

In some implementations, the method of the present disclosure may be employed in a secondary cementing operation. In these implementations, data sensors are mixed with a sealant composition (e.g., a secondary cement slurry) at block 904 of FIG. 9 and subsequent or during positioning and hardening of the cement, the sensors are interrogated to monitor the performance of the secondary cement in an analogous manner to the incorporation and monitoring of the data sensors in primary cementing methods disclosed hereinabove. For example, the MEMS sensors may be used to verify that the secondary sealant is functioning properly and/or to monitor its long-term integrity.

In implementations, the methods of the present disclosure are utilized for monitoring cementitious sealants (e.g., hydraulic cement), non-cementitious (e.g., polymer, latex or resin systems), or combinations thereof, which may be used in primary, secondary, or other sealing applications. For example, expandable tubulars such as pipe, pipe string, casing, liner, or the like are often sealed in a subterranean formation. The expandable tubular (e.g., casing) is placed in the wellbore, a sealing composition is placed into the wellbore, the expandable tubular is expanded, and the sealing composition is allowed to set in the wellbore. For example, after expandable casing is placed downhole, a mandrel may be run through the casing to expand the casing diametrically, with expansions up to 25% possible. The expandable tubular may be placed in the wellbore before or after placing the sealing composition in the wellbore. The expandable tubular may be expanded before, during, or after the set of the sealing composition. When the tubular is expanded during or after the set of the sealing composition, resilient compositions will remain competent due to their elasticity and compressibility. Additional tubulars may be used to extend the wellbore into the subterranean formation below the first tubular as is known to those of skill in the art. Sealant compositions and methods of using the compositions with expandable tubulars are disclosed in U.S. Pat. Nos. 6,722,433 and 7,040,404 and U.S. Pat. Pub. No. 2004/0167248, each of which is incorporated by reference herein in its entirety. In expandable tubular implementations, the sealants may comprise compressible hydraulic cement compositions and/or non-cementitious compositions.

Compressible hydraulic cement compositions have been developed which remain competent (continue to support and seal the pipe) when compressed, and such compositions may comprise MEMS sensors. The sealant composition is placed in the annulus between the wellbore and the pipe or pipe string, the sealant is allowed to harden into an impermeable mass, and thereafter, the expandable pipe or pipe string is expanded whereby the hardened sealant composition is compressed. In implementations, the compressible foamed sealant composition comprises a hydraulic cement, a rubber latex, a rubber latex stabilizer, a gas and a mixture of foaming and foam stabilizing surfactants. Suitable hydraulic cements include, but are not limited to, Portland cement and calcium aluminate cement. In some implementations, the settable composition may include a polymeric additive. The polymer additive may be a monomer, a pre-polymer, an oligomer, or a short chain polymer that polymerizes in response to the sonic signal. In these examples, activators may include a free-radical dopant that releases autocatalytic free radicals in response to the sonic signal such that the released autocatalytic free radicals initiate polymerization of at least a portion of the settable composition.

Often, non-cementitious resilient sealants with comparable strength to cement, but greater elasticity and compressibility, are required for cementing expandable casing. In some implementations, these sealants comprise polymeric sealing compositions, and such compositions may comprise MEMS sensors. In some implementations, the sealants composition comprises a polymer and a metal containing compound. In some implementations, the polymer comprises copolymers, terpolymers, and interpolymers. The metal-containing compounds may comprise zinc, tin, iron, selenium magnesium, chromium, or cadmium. The compounds may be in the form of an oxide, carboxylic acid salt, a complex with dithiocarbamate ligand, or a complex with mercaptobenzothiazole ligand. In some implementations, the sealant comprises a mixture of latex, dithio carbamate, zinc oxide, and sulfur.

In some implementations, the methods of the present disclosure comprise adding data sensors to a sealant to be used behind expandable casing to monitor the integrity of the sealant upon expansion of the casing and during the service life of the sealant. In this implementation, the sensors may comprise MEMS sensors capable of measuring, for example, moisture and/or temperature change. If the sealant develops cracks, water influx may thus be detected via moisture and/or temperature indication.

In an implementation, the MEMS sensor are added to one or more wellbore servicing compositions used or placed downhole in drilling or completing a monodiameter wellbore as disclosed in U.S. Pat. No. 7,066,284 and U.S. Pat. Pub. No. 2005/0241855, each of which is incorporated by reference herein in its entirety. In an implementation, the MEMS sensors are included in a chemical casing composition used in a monodiameter wellbore. In another implementation, the MEMS sensors are included in compositions (e.g., sealants) used to place expandable casing or tubulars in a monodiameter wellbore. Examples of chemical casings are disclosed in U.S. Pat. Nos. 6,702,044; 6,823,940; and 6,848,519, each of which is incorporated herein by reference in its entirety.

In some implementations, the MEMS sensors are used to gather sealant data and monitor the long-term integrity of the sealant composition placed in a wellbore, for example a wellbore for the recovery of natural resources such as water or hydrocarbons or an injection well for disposal or storage. In an implementation, data/information gathered and/or derived from MEMS sensors in a downhole wellbore sealant comprises at least a portion of the input and/or output to into one or more calculators, simulations, or models used to predict, select, and/or monitor the performance of wellbore sealant compositions over the life of a well. Such models and simulators may be used to select a sealant composition comprising MEMS for use in a wellbore. After placement in the wellbore, the MEMS sensors may provide data that can be used to refine, recalibrate, or correct the models and simulators. Furthermore, the MEMS sensors can be used to monitor and record the downhole conditions that the sealant is subjected to, and sealant performance may be correlated to such long term data to provide an indication of problems or the potential for problems in the same or different wellbores. In various implementations, data gathered from MEMS sensors is used to select a sealant composition or otherwise evaluate or monitor such sealants, as disclosed in U.S. Pat. Nos. 6,697,738; 6,922,637; and 7,133,778, each of which is incorporated by reference herein in its entirety.

Referring to FIG. 11, a method 1100 for selecting a sealant (e.g., a cementing composition) for sealing a subterranean zone penetrated by a wellbore according to the present implementation basically comprises determining a group of effective compositions from a group of compositions given estimated conditions experienced during the life of the well, and estimating the risk parameters for each of the group of effective compositions. In an alternative implementation, actual measured conditions experienced during the life of the well, in addition to or in lieu of the estimated conditions, may be used. Such actual measured conditions may be obtained for example via sealant compositions comprising MEMS sensors as described herein. Effectiveness considerations include concerns that the sealant composition be stable under downhole conditions of pressure and temperature, resist downhole chemicals, and possess the mechanical properties to withstand stresses from various downhole operations to provide zonal isolation for the life of the well.

In step 1102, well input data for a particular well is determined. Well input data includes routinely measurable or calculable parameters inherent in a well, including vertical depth of the well, overburden gradient, pore pressure, maximum and minimum horizontal stresses, hole size, casing outer diameter, casing inner diameter, density of drilling fluid, desired density of sealant slurry for pumping, density of completion fluid, and top of sealant. As will be discussed in greater detail with reference to step 1104, the well can be computer modeled. In modeling, the stress state in the well at the end of drilling, and before the sealant slurry is pumped into the annular space, affects the stress state for the interface boundary between the rock and the sealant composition. Thus, the stress state in the rock with the drilling fluid is evaluated, and properties of the rock such as Young's modulus, Poisson's ratio, and yield parameters are used to analyze the rock stress state. These terms and their methods of determination are well known to those skilled in the art. It is understood that well input data will vary between individual wells. In an alternative implementation, well input data includes data that is obtained via sealant compositions comprising MEMS sensors as described herein.

In step 1104, the well events applicable to the well are determined. For example, cement hydration (setting) is a well event. Other well events include pressure testing, well completions, hydraulic fracturing, hydrocarbon production, fluid injection, perforation, subsequent drilling, formation movement as a result of producing hydrocarbons at high rates from unconsolidated formation, and tectonic movement after the sealant composition has been pumped in place. Well events include those events that are certain to happen during the life of the well, such as cement hydration, and those events that are readily predicted to occur during the life of the well, given a particular well's location, rock type, and other factors well known in the art. In an implementation, well events and data associated therewith may be obtained via sealant compositions comprising MEMS sensors as described herein.

Each well event is associated with a certain type of stress, for example, cement hydration is associated with shrinkage, pressure testing is associated with pressure, well completions, hydraulic fracturing, and hydrocarbon production are associated with pressure and temperature, fluid injection is associated with temperature, formation movement is associated with load, and perforation and subsequent drilling are associated with dynamic load. As can be appreciated, each type of stress can be characterized by an equation for the stress state (collectively "well event stress states"), as described in more detail in U.S. Pat. No. 7,133,778 which is incorporated herein by reference in its entirety.

In step 1106, the well input data, the well event stress states, and the sealant data are used to determine the effect of well events on the integrity of the sealant sheath during the life of the well for each of the sealant compositions. The sealant compositions that would be effective for sealing the subterranean zone and their capacity from its elastic limit are determined. In an alternative implementation, the estimated effects over the life of the well are compared to and/or corrected in comparison to corresponding actual data gathered over the life of the well via sealant compositions comprising MEMS sensors as described herein. Step 1106 concludes by determining which sealant compositions would be effective in maintaining the integrity of the resulting cement sheath for the life of the well.

In step 1108, parameters for risk of sealant failure for the effective sealant compositions are determined. For example, even though a sealant composition is deemed effective, one sealant composition may be more effective than another. In one implementation, the risk parameters are calculated as percentages of sealant competency during the determination of effectiveness in step 1106. In an alternative implementation, the risk parameters are compared to and/or corrected in comparison to actual data gathered over the life of the well via sealant compositions comprising MEMS sensors as described herein.

Step 1108 provides data that allows a user to perform a cost benefit analysis. Due to the high cost of remedial operations, it is important that an effective sealant composition is selected for the conditions anticipated to be experienced during the life of the well. It is understood that each of the sealant compositions has a readily calculable monetary cost. Under certain conditions, several sealant compositions may be equally efficacious, yet one may have the added virtue of being less expensive. Thus, it should be used to minimize costs. More commonly, one sealant composition will be more efficacious, but also more expensive. Accordingly, in step 1110, an effective sealant composition with acceptable risk parameters is selected given the desired cost. Furthermore, the overall results of steps 1102-1110 can be compared to actual data that is obtained via sealant compositions comprising MEMS sensors as described herein, and such data may be used to modify and/or correct the inputs and/or outputs to the various steps 1102-1110 to improve the accuracy of same.

As discussed above and with reference to FIG. 1, wipers are often utilized during conventional primary cementing to force cement slurry out of the casing. The wiper plug also serves another purpose: typically, the end of a cementing operation is signaled when the wiper plug contacts a restriction (e.g., casing shoe) inside the tubing string 116 at the bottom of the string. When the plug contacts the restriction, a sudden pressure increase at pump 130 is registered. In this way, it can be determined when the cement has been displaced from the tubing string 116 and fluid flow returning to the surface via casing annulus 122 stops.

In reverse circulation cementing, it may also be necessary to correctly determine when cement slurry completely fills the annulus 122. Continuing to pump cement into annulus 122 after cement has reached the far end of annulus 122 forces cement into the far end of tubing string 116, which could incur lost time if cement must be drilled out to continue drilling operations.

The methods disclosed herein may be utilized to determine when cement slurry has been appropriately positioned downhole. Furthermore, as discussed hereinbelow, the methods of the present disclosure may additionally comprise using a MEMS sensor to actuate a valve or other mechanical means to close and prevent cement from entering the casing upon determination of completion of a cementing operation.

The way in which the method of the present disclosure may be used to signal when cement is appropriately positioned within annulus 122 will now be described within the context of a reverse circulation cementing operation. FIG. 10 is a flowchart of a method for determining completion of a cementing operation and optionally further actuating a downhole tool upon completion (or to initiate completion) of the cementing operation. This description will reference the flowchart of FIG. 10, as well as the wellbore depiction of FIG. 1.

At block 1002, a data interrogator tool as described hereinabove is positioned at the far end of tubing string 116. In an implementation, the data interrogator tool is incorporated with or adjacent to a casing shoe positioned at the bottom end of the casing and in communication with operators at the surface. At block 1004, MEMS sensors are added to a fluid (e.g., cement slurry, spacer fluid, displacement fluid, etc.) to be pumped into annulus 122. At block 1006, cement slurry is pumped into annulus 122. In an implementation, MEMS sensors may be placed in substantially all of the cement slurry pumped into the wellbore. In some implementations, MEMS sensors may be placed in a leading plug or otherwise placed in an initial portion of the cement to indicate a leading edge of the cement slurry. In an implementation, MEMS sensors are placed in leading and trailing plugs to signal the beginning and end of the cement slurry. While cement is continuously pumped into annulus 122, at decision 1008, the data interrogator tool (DIT) is attempting to detect whether the data sensors are in communicative proximity with the data interrogator tool. As long as no data sensors are detected, the pumping of additional cement into the annulus continues. When the data interrogator tool detects the sensors at block 1010 indicating that the leading edge of the cement has reached the bottom of the casing, the interrogator sends a signal to terminate pumping. The cement in the annulus is allowed to set and form a substantially impermeable mass which physically supports and positions the casing in the wellbore and bonds the casing to the walls of the wellbore in block 1020.

If the fluid of block 1004 is the cement slurry, MEMS-based data sensors are incorporated within the set cement, and parameters of the cement (e.g., temperature, pressure, ion concentration, stress, strain, etc.) can be monitored during placement and for the duration of the service life of the cement according to methods disclosed hereinabove. Alternatively or in combination, the data sensors may be added to an interface fluid (e.g., spacer fluid or other fluid plug) introduced into the annulus prior to and/or after introduction of cement slurry into the annulus.

The method just described for determination of the completion of a primary wellbore cementing operation may further comprise the activation of a downhole tool. For example, at block 1002, a valve or other tool may be operably associated with a data interrogator tool at the far end of the casing. This valve may be contained within float shoe 132, for example, as disclosed hereinabove. Again, float shoe 132 may contain an integral data interrogator tool, or may otherwise be coupled to a data interrogator tool. For example, the data interrogator tool may be positioned between tubing string 116 and float shoe 132. Following the method previously described and blocks 1004 to 1008, pumping continues as the data interrogator tool detects the presence or absence of data sensors in close proximity to the interrogator tool (dependent upon the specific method cementing method being employed, e.g., reverse circulation, and the positioning of the sensors within the cement flow). Upon detection of a determinative presence or absence of sensors in close proximity indicating the termination of the cement slurry, the data interrogator tool sends a signal to actuate the tool (e.g., valve) at block 1012. At block 1014, the valve closes, sealing the casing and preventing cement from entering the portion of casing string above the valve in a reverse cementing operation. At block 1016, the closing of the valve at 1016, causes an increase in back pressure that is detected at the hydraulic pump 130. At block 1018, pumping is discontinued, and cement is allowed to set in the annulus at block 1020. In implementations wherein data sensors have been incorporated throughout the cement, parameters of the cement (and thus cement integrity) can additionally be monitored during placement and for the duration of the service life of the cement according to methods disclosed hereinabove.

Improved methods of monitoring wellbore sealant condition from placement through the service lifetime of the sealant as disclosed herein provide a number of advantages. Such methods are capable of detecting changes in parameters in wellbore sealant such as moisture content, temperature, pH, and the concentration of ions (e.g., chloride, sodium, and potassium ions). Such methods provide this data for monitoring the condition of sealant from the initial quality control period during mixing and/or placement, through the sealant's useful service life, and through its period of deterioration and/or repair. Such methods are cost efficient and allow determination of real-time data using sensors capable of functioning without the need for a direct power source (i.e., passive rather than active sensors), such that sensor size be minimal to maintain sealant strength and sealant slurry pumpability. The use of MEMS sensors for determining wellbore characteristics or parameters may also be utilized in methods of pricing a well servicing treatment, selecting a treatment for the well servicing operation, and/or monitoring a well servicing treatment during real-time performance thereof, for example, as described in U.S. Pat. Pub. No. 2006/0047527 A1, which is incorporated by reference herein in its entirety.

While preferred implementations of the methods have been shown and described, modifications thereof can be made by one skilled in the art without departing from the spirit and teachings of the present disclosure. The implementations described herein are exemplary only, and are not intended to be limiting. Many variations and modifications of the methods disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an implementation of the present disclosure. Thus, the claims are a further description and are an addition to the preferred implementations of the present disclosure. The discussion of a reference herein is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural or other details supplementary to those set forth herein.

A number of implementations of the invention have been described. Nevertheless, it will be understood that various modifications may be made without departing from the spirit and scope of the invention. Accordingly, other implementations are within the scope of the following claims.

What is claimed is:

1. A set-on-command mixture, comprising:
   a settable composition; and
   an activation device in a wellbore, wherein the activation device is capable of increasing a setting rate of the settable composition in response to an activation signal, and the activation signal comprises at least one of an electromagnetic signal, a pressure signal, a magnetic signal, an electric signal, an acoustic signal, an ultrasonic signal, or a radiation signal comprising at least one of neutrons, alpha particles, or beta particles.

2. The mixture of claim 1, wherein the settable composition sets in a range from one hour to one day after reacting with an activator included in the activation device.

3. The mixture of claim 1, wherein the activation device includes at least one dimension in a range from about 1 micrometers (μm) to about 10,000 μm.

4. A set-on-command cement mixture, comprising:
   a cement composition including a hydraulic cement, a base fluid, and a set retarder; and
   an activation device that releases an activator that increases a setting rate of the cement composition in response to a wireless signal.

5. The mixture of claim 4, wherein the cement composition sets in a range from one hour to one day after reacting with the activator.

6. The mixture of claim 4, wherein the cement composition is mixed at density in a range from about 4 to about 24 pounds per gallon (ppg).

7. The mixture of claim 1, wherein the activation device is a Micro-Electro-Mechanical System (MEMS) device.

8. The mixture of claim 4, wherein the activator comprises at least one of sodium hydroxide, sodium carbonate, amine compounds, salts comprising calcium, sodium, magnesium, aluminum, or combinations thereof.

9. The mixture of claim 4, wherein the activation device includes at least one dimension in a range from 1 μm to 10,000 μm.

10. The mixture of claim 4, wherein the activation device includes a voltage generator configured to generate a voltage in an alkaline or acidic environment independent of an internal power supply.

11. The mixture of claim 10, wherein the voltage generator includes a first element including a metal surface in contact with the cement composition and a second element including a metallic-salt surface in contact with the cement composition, and wherein the first element and the second element generate a voltage difference in response to contacting the cement composition.

12. The mixture of claim 11, wherein the metal surface comprises zinc and the metallic-salt surface comprises manganese dioxide.

13. The mixture of claim 4, wherein the activation device includes a polymer membrane for enclosing the activator in a substrate, and wherein the polymer membrane forms an opening to release the activator in response to an acoustic signal.

14. The mixture of claim 13, wherein the polymer membrane includes at least one of a polystyrene, ethylene/vinyl acetate copolymer, polymethylmethacrylate polyurethanes, polylactic acid, polyglycolic acid, polyvinylalcohol, polyvinylacetate, hydrolyzed ethylene/vinyl acetate, or silicones.

15. The mixture of claim 4, wherein the wireless signal comprises at least one of an electromagnetic signal, a pressure signal, a magnetic signal, an electric signal, an acoustic signal, an ultrasonic signal or a radiation signal, and wherein the radiation signal comprises at least one of neutrons, alpha particles, or beta particles.

16. The mixture of claim 4, wherein the wireless signal comprises an ultrasonic signal.

17. The mixture of claim 16, wherein the ultrasonic signal comprises transmitted at a frequency in a range of from about 20 kiloHertz (kHz) to about 500 kHz.

18. The mixture of claim 4, wherein the wireless signal comprises an acoustic signal.

19. The mixture of claim 18, wherein the acoustic signal is transmitted at a frequency in a range of from about 20 Hertz to about 20 kHz.

20. The mixture of claim 4, wherein the activator is partially enclosed by an element including at least one of a polystyrene, ethylene/vinyl acetate copolymer, polymethylmethacrylate polyurethanes, polylactic acid, polyglycolic acid, polyvinylalcohol, polyvinylacetate, or hydrolyzed ethylene/vinyl acetate.

21. The mixture of claim 4, wherein the activator is mixed with the cement composition at a concentration from about 0.5% to about 30% by weight of the cement composition.

22. The mixture of claim 4, wherein the cement composition includes at least one of Portland cement, pozzolanic cement, high aluminate cement, gypsum cement, silica cement, high alkalinity cement, or sorel cement.

* * * * *